(12) United States Patent
Wang

(10) Patent No.: US 8,947,498 B2
(45) Date of Patent: Feb. 3, 2015

(54) METHOD AND DEVICE FOR PROCESSING MULTI-PICTURE VIDEO IMAGE

(75) Inventor: Pulin Wang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 275 days.

(21) Appl. No.: 13/562,003

(22) Filed: Jul. 30, 2012

(65) Prior Publication Data
US 2012/0293603 A1  Nov. 22, 2012

Related U.S. Application Data

(63) Continuation of application No. PCT/CN2011/070688, filed on Jan. 27, 2011.

(30) Foreign Application Priority Data

Jan. 29, 2010  (CN) .......................... 2010 1 0104939

(51) Int. Cl.
*H04N 7/14* (2006.01)

(52) U.S. Cl.
USPC ..................................... 348/14.12; 348/14.07

(58) Field of Classification Search
USPC ................. 348/14.01–14.09, 14.12
See application file for complete search history.

(56) References Cited

U.S. PATENT DOCUMENTS

| 5,555,026 A | 9/1996 | Lee |
| 2006/0146065 A1 | 7/2006 | Wada |
| 2008/0231688 A1* | 9/2008 | Luo ............................ 348/14.09 |
| 2009/0167782 A1 | 7/2009 | Petljanski et al. |

FOREIGN PATENT DOCUMENTS

| CN | 1852414 A | 10/2006 |
| CN | 101052125 A | 10/2007 |
| CN | 101179696 A | 5/2008 |
| CN | 101778246 A | 7/2010 |

(Continued)

OTHER PUBLICATIONS

Office Action issued in corresponding Chinese Patent Application No. 201010104939.4 (including partial English translation); mailed May 17, 2013.

(Continued)

*Primary Examiner* — Olisa Anwah
(74) *Attorney, Agent, or Firm* — Brinks Gilson & Lione

(57) ABSTRACT

The embodiments of the present invention provide a method and device relating to multi-picture video image processing, which solve the problem in related art of the deterioration of the vision experience of the conventioneer as the characteristics of each sub-picture can not be satisfied simultaneously. Said method includes: receiving the data code stream of the sub-picture video images from several channels; equalizing the effect of said sub-picture video images with control parameters respectively according to the image characteristics of the sub-picture video images; synthesizing said equalized sub-picture video images to a multi-picture video image. This invention can uniformly adjust each sub-picture video image to the effect with the same image characteristics, which enables the sub-picture video images exhibit the same picture characteristic when be displayed. The display of the multi-picture video image constituted by sub-picture video images achieves whole style harmony and the vision experience of the conventioneer is improved.

17 Claims, 14 Drawing Sheets

(56) References Cited

FOREIGN PATENT DOCUMENTS

| EP | 1959691 A1 | 8/2008 |
|---|---|---|
| JP | 2005065051 A | 3/2005 |
| WO | WO 03/075581 A1 | 9/2003 |
| WO | WO 2005/025236 A1 | 3/2005 |
| WO | WO 2008/008312 A2 | 1/2008 |

OTHER PUBLICATIONS

Chinese Patent No. 101778246, issued on Apr. 2, 2014, granted in corresponding Chinese Patent Application No. 201010104939.4, 35 pages.

Extended European Search Report issued in corresponding European Patent Application No. 11736637.7, mailed Dec. 5, 2012.

Written Opinion of the International Searching Authority issued in corresponding PCT Patent Application No. PCT/CN2011/070688, mailed May 5, 2011.

International Search Report issued in corresponding PCT Patent Application No. PCT/CN2011/070688, mailed May 5, 2011.

Office Action issued in corresponding Chinese Patent Application No. 201010104939.4, mailed Apr. 21, 2011.

Office Action issued in corresponding Chinese Patent Application No. 201010104939.4, mailed Jul. 2, 2012.

\* cited by examiner

METHOD AND DEVICE FOR PROCESSING MULTI-PICTURE VIDEO IMAGE

CROSS-REFERENCE TO RELATED APPLICATIONS

This application is a continuation of International Application No. PCT/CN2011/070688, filed on Jan. 27, 2011, which claims priority to Chinese Patent Application No. 201010104939.4, filed on Jan. 29, 2010, both of which are hereby incorporated by reference in their entireties.

FIELD OF THE INVENTION

The present invention relates to the field of processing video images, and more particularly to a method and a device for processing multi-picture video images.

BACKGROUND OF THE INVENTION

With the development of coding and information compressing technologies and the rapid development of digital networks, the videoconferencing system has started to enter the market. With the rapid development of IP networks, the videoconferencing system that is based on H.323 Videoconferencing Standard has been increasingly widely applied. Governments, and enterprises have generally deployed videoconferencing systems of their own, so as to enhance the efficiency of conferences and to lower the cost of conferences.

Video conference has developed from the simple modes of point-to-point session and display of the other parties' videos by a single screen to the currently sophisticated modes of one conference held simultaneously in several conference halls, multi-picture displays, or multi-screen displays at the same time. When pictures coming from different conference halls form a single multi-picture display, or when several conference halls are simultaneously outputted for display by a plurality of display devices, because the different conference halls are subjected to influences of site environments and such conferencing equipments as lightings and camera pickups, video environments are rendered different, particularly in terms of chroma and luminance that would exhibit differences, in which case, if pictures of different conference halls are formed into a single multi-picture or outputted and displayed via a plurality of display devices, the conventioneers would have the feeling of not uniform and harmonious, and visual experience would be reduced.

In order to reduce the aforementioned influences and improve the visual experience of conventioneers, the related art provided the following two solving schemes.

Scheme A:

Picture Adjustment at the Source Terminal—whereby before a picture of a certain conference hall is outputted to target conference halls, effect is adjusted at the conference hall input terminal. For instance, each of conference halls A, B, C and D individually adjusts parameters of its respective video collecting devices, for example by adjusting the color and luminance parameters of the camera pickups, or by improving the effects of respective conference hall pictures through automatically adjusting functions supported by the camera pickups, to thus ensure that the pictures be outputted to the target conference halls to be spliced as a multi-picture only after the effects of respective conference halls become optimal.

However, there are differences in video collecting devices of the conference halls, and site environments of the conference halls are also not identical due to influences such as strong and weak lights and colors of lightings—for instance, a certain conference hall uses lamps of cold tone, and the lights of the entire conference hall will assume the cold tone; a certain conference hall uses lamps of warm tone, and the lights of the entire conference hall will assume the warm tone. According to technical means provided by Scheme A, when conference halls separately adjust their picture effects, environment differences with respect to other conference halls will not be taken into full consideration, and thus, when pictures of the various conference halls are gathered to be spliced into a single multi-picture, luminance and color characteristics of various sub-pictures in the multi-picture will be starkly different from one another, thus deteriorating visual experience.

Scheme B:

Adjustment of Outputted Picture—whereby effect is adjusted at the conference hall output terminal. For instance, when a single multi-picture is received at a multi-picture conference, various sub-pictures are simultaneously modified by adjusting the output modes (parameters such as color and luminance) of the display device, to uniformly adjust the output effect of the entire multi-picture.

Since image characteristics of various sub-pictures outputted from the multi-picture have already been fixed, the aforementioned uniform adjustment of the output effect of the entire multi-picture by adjusting the output modes of the display device is not a type of differential adjustment, and it is usually impossible to provide all the sub-pictures with excellent visual experience because the effects of other sub-pictures are affected while the effect of one sub-picture is satisfied.

SUMMARY OF THE INVENTION

Embodiments of the present invention provide a method and a device that relate to multi-picture video image processing, and that solve the problem of the related art technical solution in which visual experience of conventioneers is deteriorated due to the incapability to simultaneously satisfy characteristics of various sub-pictures at the same time, when the multi-picture is adjusted.

Provided is a method for processing a multi-picture video image, which method comprises: receiving a data code stream of sub-picture video images from several channels; equalizing effect of the multi-channel sub-picture video images with control parameters respectively according to image characteristics of the sub-picture video images; and synthesizing the equalized sub-picture video images from several channels to a multi-picture video image.

Further provided is a device for processing a multi-picture video image, which device comprises: an equalizing module, for receiving a data code stream of sub-picture video images from several channels, and equalizing effect of the sub-picture video images from several channels with control parameters respectively according to image characteristics of the sub-picture video images; and a synthesizing module, for synthesizing the sub-picture video images equalized by the equalizing module to a multi-picture video image.

Embodiments of the present invention obtain image characteristics of sub-picture video images from several channels, independently calculate adjustment coefficients according to the obtained image characteristics of the sub-picture video images, and make use of identical control parameters and independently calculated adjustment coefficients to equalize sub-picture video images coming from respective conference halls before these images form a multi-picture video image.

Since the present invention separately calculates adjustment coefficients with respect to the various independent sub-picture video images according to identical control parameters, after equalization by means of the adjustment coefficients and the identical control parameters, it is possible to uniformly adjust the various sub-picture video images to the effect of having the same image characteristics, so that the sub-picture video images exhibit identical picture characteristics during display, to thereby achieve harmony in whole style during display of a multi-picture video image formed by the sub-picture video images, and to improve visual experience of the conventioneers.

BRIEF DESCRIPTION OF THE DRAWINGS

To make clearer the explanation of technical solutions of the embodiments of the present invention or of the related art, drawings needed in the description of the embodiments or the related art are briefly illustrated below. Apparently, the drawings illustrated below are merely directed to some embodiments of the present invention, and it is possible for persons ordinarily skilled in the art to deduce other drawings from these drawings without creative effort.

DETAILED DESCRIPTION OF THE INVENTION

The technical solutions according to the embodiments of the present invention will be clearly and completely described below with reference to the drawings. Apparently, the embodiments as described below are merely partial, rather than entire, embodiments of the present invention. On the basis of the embodiments of the present invention, all other embodiments obtainable by persons ordinarily skilled in the art without creative effort shall all fall within the protection scope of the present invention.

Different from related art technologies, in the embodiments of the present invention, sub-picture video images coming from respective conference halls are equalized by means of identical control parameters and independently calculated adjustment coefficients before these images form a multi-picture video image, whereby effects of these sub-picture video images in the finally formed multi-picture video image exhibit the same characteristics.

Figure 1:
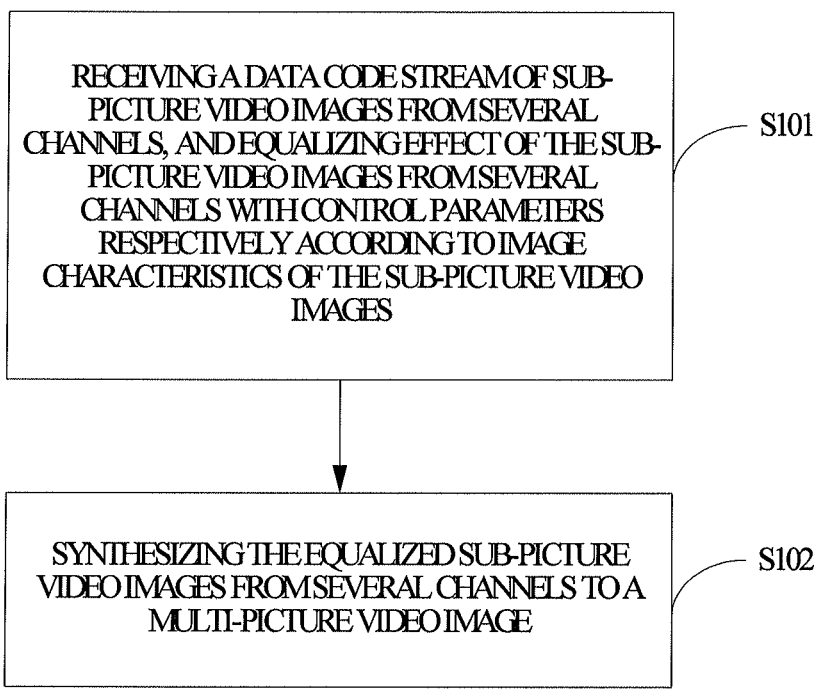
FIG. 1 is a flowchart exemplarily illustrating the method provided by Embodiment 1 of the present invention for processing a multi-picture video image.

Referring to FIG. 1, which is a basic flowchart exemplarily illustrating the method provided by Embodiment 1 of the present invention for processing a multi-picture video image, the method mainly comprises the following steps.

S101—receiving a data code stream of sub-picture video images from several channels, and equalizing effect of the sub-picture video images from several channels with control parameters respectively according to image characteristics of the sub-picture video images.

In this embodiment, the sub-picture video images from several channels refer to a set of sub-picture video image from one channel which is coming from a single conference hall (also referred to as conference hall unit) in a videoconference.

S102—synthesizing the equalized sub-picture video images from several channels to a multi-picture video image.

Implementation of the embodiment of present invention is explained below with an example in which a control parameter is used to equalize one channel sub-picture video image.

Figure 2:
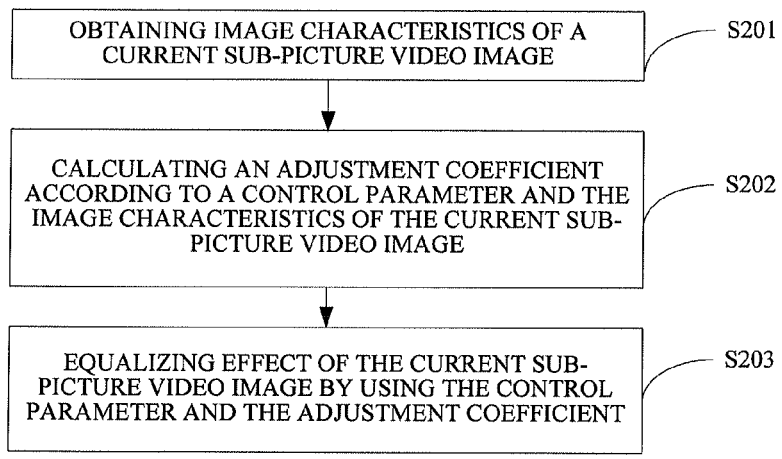
FIG. 2 is a flowchart exemplarily illustrating the effect method provided by Embodiment 2 of the present invention of using control parameters respectively to equalize sub-picture video images from several channels.

Referring to FIG. 2, which is a basic flowchart exemplarily illustrating the effect method provided by Embodiment 2 of the present invention of using control parameters respectively to equalize sub-picture video images from several channels, the method mainly comprises the following steps.

S201—obtaining image characteristics of a current sub-picture video image.

In the embodiments of the present invention, although the whole effect of a sub-picture video image is the result of combined action of all pixel points in the sub-picture, for obtaining image characteristics of the sub-picture video image, it does not require parameters of all the pixel points; that is to say, for one frame of sub-picture video image, it suffices to make statistics about limited number of pixel points to determine image characteristics of the image.

Out of considerations for simplicity and easy realization, a histogram statistical method can be used in the embodiments of the present invention to make statistics about pixel points with luminance values within an interval [Alum, Blum] in one frame of sub-picture video image, where Alum is greater than or equal to 0, Blum is smaller than or equal to Lm, and Lm is the maximum value used to describe luminance standard. For instance, with respect to a typical representation method where a decimal system corresponding to 8 bits is used to describe luminance values, Lm can be set as 255 to correspond to the maximum value used to describe luminance standard; with respect to a representation method where a decimal system corresponding to 16 bits is used to describe luminance values, Lm can be set as 65535 to correspond to the maximum value used to describe luminance standard. The present invention does not make any restriction thereto.

Thereafter, it is possible to construct pixel point (to which the control parameter and the adjustment coefficient will be applied to equalize an effect of the current sub-picture video image)-luminance value statistical chart of the current sub-picture video image from pixel points with luminance values within the interval [Alum, Blum] and luminance values, to which the pixel points in this range correspond, and luminance characteristics of the current sub-picture video image can be determined from the pixel point-luminance value statistical chart. For instance, suppose that luminance values of great quantities of pixel points (exceeding 80% of the total pixel points, for example) in the pixel point-luminance value statistical chart are smaller than the luminance value (of 100, for example) of a frame of image having normal luminance, it is determinable that the luminance characteristics of the current sub-picture video image indicate that "the image is relatively dark", and it is necessary to adequately increase the luminance of the current sub-picture video image by certain means; to the contrary, if luminance values of great quantities of pixel points (exceeding 80% of the total pixel points, for example) in the pixel point-luminance value statistical chart are greater than the luminance value (of 100, for example) of a frame of image having normal luminance, it is determinable that the luminance characteristics of the current sub-picture video image indicate that "the image is relatively bright", and it is necessary to adequately decrease the luminance of the current sub-picture video image by certain means.

Likewise, it is also possible to use the histogram statistical method to make statistics about pixel points with chroma values within a certain range in a frame of sub-picture video image to determine the chroma characteristics of the sub-picture video image. For instance, the chroma characteristics of the sub-picture video image are determined by making statistics about pixel points with chroma red (CR) values or chroma blue (CB) values within a certain range in a frame of sub-picture video image. Since the white color is a basic color and has a relatively large luminance value of usually 200 and more (a value determined when a decimal system corresponding to 8 bits is used to represent chroma values), for example, different from the statistics about the luminance values of images, statistics about CR values or CB values in the embodiments of the present invention is so carried out that pixel points with chroma values close to chroma values of a white region in the current sub-picture video image are made statistics about, a pixel point-chroma value statistical chart is constructed from the pixel points with chroma values close to the chroma values of the white region and the corresponding chroma values thereof, and the chroma characteristics of the current sub-picture video image are then determined from the pixel point-chroma value statistical chart.

For instance, for the white region, both the CR values and CB values are close to 128 (a value determined when a decimal system corresponding to 8 bits is used to represent chroma values); in view thereof, it is possible in the embodiments of the present invention to make statistics about pixel points with chroma values within [128−T2, 128+T2]. Since T2 is a relatively small value (smaller than or equal to 10, for example), pixel points with chroma values within [128−T2, 128+T2] are precisely the pixel points with chroma values close to chroma values of the white region. Accordingly, if chroma values (CR values or CB values) of most pixel points in the pixel point-chroma value statistical chart constructed by making statistics about the pixel points with chroma values close to chroma values of the white region in the current sub-picture video image are smaller or greater than 128, it is determinable that the chroma characteristics of the current sub-picture video image indicate chroma offset, for example, offset to blue, offset to green or offset to red, etc., and it is necessary to adequately adjust the chroma of the current sub-picture video image through certain means.

S202—calculating an adjustment coefficient according to a control parameter and the image characteristics of the current sub-picture video image.

As previously mentioned, the received sub-picture video image might have luminance offset or chroma offset.

It is possible in the embodiments of the present invention to calculate an adjustment coefficient according to the control parameter and the image characteristics of the current sub-picture video image, and to use the adjustment coefficient and the control parameter to modify chroma offset or luminance offset of the sub-picture video image, so as to equalize the effect of the sub-picture video image.

For instance, for the luminance of the current sub-picture video image, it is possible to calculate a first luminance adjustment coefficient CL1 and a second luminance adjustment coefficient CL2 of the current sub-picture video image according to the image characteristics of the current sub-picture video image and a predetermined or preset control parameter. The control parameter can be a reference value used to equalize the current sub-picture video image to a target luminance value, and is represented as Lo in this embodiment. By the use of the reference value Lo, it can be guaranteed that the current sub-picture video image is neither brighter nor darker after modification. Calculation of the first luminance adjustment coefficient CL1 and the second luminance adjustment coefficient CL2 of the current sub-picture video image can specifically be carried out as follows.

S2021—counting from a pixel point with a pixel value of Apix of pixel points with pixel values within an interval [Apix, Bpix] in the pixel point-luminance value statistical chart, and obtaining a pixel value P0 of a $k^{th}$ pixel point when counting to the $k^{th}$ pixel point, wherein the Apix and Bpix are respectively equal to the Alum and Blum in numerical value.

Preferably, for pixel points within the interval [Apix, Bpix], it is possible to obtain a pixel value P0 of an $N/2^{th}$ pixel point when counting to the half of the pixel points in the pixel point-luminance value statistical chart, namely when counting to the $N/2^{th}$ (when N/2 is not an integer, N/2 can be rounded up to the closest integer) pixel point, wherein N represents the number of pixel points in the pixel point-luminance value statistical chart of the current sub-picture video image, namely the number of pixel point samples about which statistics is made in the pixel point-luminance value statistical chart.

S2022—calculating to obtain a first luminance adjustment coefficient CL1 and a second luminance adjustment coefficient CL2 from the Apix, Bpix, P0 and Lo, wherein both the first luminance adjustment coefficient CL1 and the second luminance adjustment coefficient CL2 are of a linear relationship to the Lo.

For instance, it is possible to obtain from Apix, Bpix, P0 and Lo the first luminance adjustment coefficient CL1 as Lo/(P0−Apix) and the second luminance adjustment coefficient CL2 as Lo/(Bpix−P0), and it is obvious that both CL1 and CL2 are of a linear relationship to Lo. A more concrete example is taken below.

For instance, if the reference value Lo used to equalize the current sub-picture video image to the target luminance value is 128, there are N pixel points in the pixel point-luminance value statistical chart of the sub-picture video image, the pixel values thereof are within [0, 255] (255 is the maximum pixel value determined when a decimal system corresponding to 8 bits is used to represent pixel values), and counting begins from the pixel point with the pixel value of 0. The pixel value P0 of the $N/2^{th}$ pixel point is obtained when counting to the $N/2^{th}$ pixel point, and the pixel value P0 is within the interval [0, 255]. The value of 128/P0 is calculated to obtain the first luminance adjustment coefficient of the current sub-picture video image as CL1=128/P0, and the value of 128/(255−P0) is calculated to obtain the second luminance adjustment coefficient of the current sub-picture video image as CL2=128/(255−P0).

For the chroma of the current sub-picture video image, it is also possible to calculate a first chroma adjustment coefficient CC1 and a second chroma adjustment coefficient CC2 of the current sub-picture video image according to the image characteristics of the current sub-picture video image and a predetermined or preset control parameter. The control parameter can be a reference value used to equalize the current sub-picture video image to a target chroma value, and is represented as Co in this embodiment. By the use of the reference value Co, it can be guaranteed that the current sub-picture video image has no color offset after modification. Calculation of the first chroma adjustment coefficient CC1 and the second chroma adjustment coefficient CC2 of the current sub-picture video image can specifically be carried out as follows.

S'2021—counting, from a pixel point with a pixel value of Jpix, of pixel points with pixel values within an interval [Jpix, Kpix] in the pixel point-chroma value statistical chart, and obtaining a pixel value P1 of a $J^{th}$ pixel point when counting to the $J^{th}$ pixel point, wherein Jpix is greater than or equal to 0, Kpix is smaller than or equal to Y, and Y is the maximum value, such as 255 or 65535, used to describe pixel value standard.

Preferably, for pixel points within the interval [Jpix, Kpix], it is possible to obtain a pixel value P1 of an $M/2^{th}$ pixel point when counting to the half of the pixel points in the pixel point-chroma value statistical chart, namely when counting to the $M/2^{th}$ (when M/2 is not an integer, M/2 can be rounded up to the closest integer) pixel point, wherein M represents the number of pixel points in the pixel point-chroma value statistical chart of the current sub-picture video image, namely the number of pixel point samples about which statistics is made in the pixel point-chroma value statistical chart.

S'2022—calculating to obtain a first chroma adjustment coefficient CC1 and a second chroma adjustment coefficient CC2 from the Jpix, Kpix, P1 and Co, wherein both the first chroma adjustment coefficient CC1 and the second chroma adjustment coefficient CC2 are of a linear relationship to the Co.

For instance, it is possible to obtain from Jpix, Kpix, P1 and Co the first chroma adjustment coefficient CC1 as Co/(P1−Jpix) and the second chroma adjustment coefficient CC2 as Co/(Kpix−P1), and it is obvious that both CC1 and CC2 are of a linear relationship to Co.

A concrete example is taken below to make explanation.

If the reference value Co used to equalize the current sub-picture video image to the target chroma value is 128, there are N pixel points in the pixel point-chroma value statistical chart of the current sub-picture video image, the pixel values thereof are within [0, 255] (255 is the maximum pixel value determined when a decimal system corresponding to 8 bits is used to represent pixel values), and counting begins from the pixel point with the pixel value of 0. The pixel value P1 of the $N/2^{th}$ pixel point is obtained when counting to the $N/2^{th}$ pixel point, and the pixel value P1 is within the interval [0, 255]. The value of 128/P1 is calculated to obtain the first luminance adjustment coefficient of the current sub-picture video image as CL1=128/P1, and the value of 128/(255−P1) is calculated to obtain the second luminance adjustment coefficient of the current sub-picture video image as CL2=128/(255−P1).

Since each frame of sub-picture video image is equalized by calculating different luminance or chroma adjustment coefficients according to image characteristics and by using the same control parameter, in comparison with related art technologies, the adjustment mode in this embodiment enables the sub-picture video image to exhibit the same picture characteristics during display.

S203—equalizing effect of the current sub-picture video image by using the control parameter and the adjustment coefficient.

For the equalization of the luminance effect of the current sub-picture video image, it is possible to use the reference value Lo and the first luminance adjustment coefficient CL1 calculated in S202 to linearly modify luminance values of pixel points with pixel values within an interval [Apix, P0], to obtain a luminance value L1 of the current sub-picture video image within the interval [Apix, P0], and to use the reference value Lo and the second luminance adjustment coefficient CL2 to linearly modify luminance values of pixel points with pixel values within an interval [P0, Bpix], to obtain a luminance value L2 of the current sub-picture video image within the interval [P0, Bpix]. The so-called linear modification refers to increase or decrease the luminance values of the pixel points within the interval [Apix, P0] by the same proportion; since each pixel point is increased or decreased by the same proportion, visual effect of the entire linearly modified sub-picture image is coordinated, and there will be no such phenomenon as being darker at certain portion and being brighter at certain portion.

For instance, if the first luminance adjustment coefficient CL1 calculated in the foregoing embodiment is Lo/(P0−Apix), when the luminance effect of the current sub-picture video image is equalized, it is possible to modify the luminance values of pixel points within the interval [Apix, P0] in the current sub-picture video image as CL1×(P−Apix) and then output the result, and to modify the luminance values of pixel points within the interval [P0, Bpix] in the current sub-picture video image as Blum−(CL2×(Bpix−P)) and then output the result, wherein P is the pixel value of the pixel points in the current sub-picture video image before the equalization.

For the equalization of the chroma (including CB or CR) effect of the current sub-picture video image, it is possible to use the reference value Co and the first chroma adjustment coefficient CC1 calculated in S202 to linearly modify chroma values of pixel points with pixel values within an interval

[Jpix, P1], to obtain a chroma value C1 of the current sub-picture video image within the interval [Jpix, P1], and to use the reference value Co and the second chroma adjustment coefficient CC2 calculated in S202 to linearly modify chroma values of pixel points with pixel values within an interval [P1, Kpix], to obtain a chroma value C2 of the current sub-picture video image within the interval [P1, Kpix].

For instance, if the first luminance adjustment coefficient CC1 calculated in the foregoing embodiment is Co/(P1−Jpix) and the second luminance adjustment coefficient CC2 is Co/(Kpix−P1), when the chroma effect of the current sub-picture video image is equalized, it is possible to modify the chroma values of pixel points within the interval [Jpix, P1] in the current sub-picture video image as CC1×(P−Jpix) and then output the result, and to modify the chroma values of pixel points within the interval [P1, Kpix] in the current sub-picture video image as Kchr−(CC2×(Kpix−P)) and then output the result, wherein P is the pixel value of the pixel points in the current sub-picture video image before the equalization, and Kchr is the chroma value of pixel points with pixel values within the interval [Jpix, Kpix], and is equivalent to Kpix in numerical value.

Figure 3:
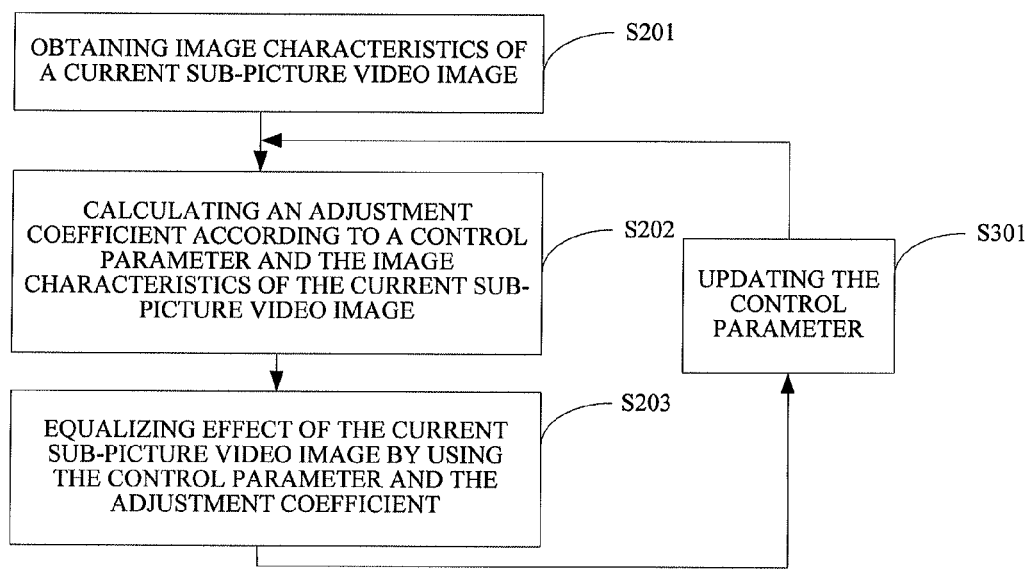
FIG. 3 is a flowchart exemplarily illustrating the method provided by Embodiment 3 of the present invention for processing a multi-picture video image.

As should be noted, the control parameter (namely the reference value Lo or the reference value Co) does not always remain invariant. If the control parameter remains invariant, this indicates that the control parameter is fixed during a relatively long period of time in which the sub-picture video image is processed. For instance, it is possible in the embodiments of the present invention to fix at 128 the reference value Lo or Co used to equalize the current sub-picture video image to the target chroma value. If the processing flow of this embodiment is modified, namely in the case of Embodiment 3 according to the present invention as shown in FIG. 3, after the control parameter and the adjustment coefficients are used to equalize the effect of the current sub-picture video image, an operation is carried out to update the control parameter, indicating that the control parameter can be obtained by detecting the whole characteristics of the sub-picture video image during a relatively long period of time in which the sub-picture video image is processed. For instance, the control parameter can be controlled to a range close to a plurality of sub-picture video images—that is to say, if the inputted sub-picture video images all exhibit similar Lum/CB/CR characteristics (for example, the plurality of inputted sub-picture video images all exhibit as being relatively dark) to be at about 100 for a relatively long period of time, the reference value Lo in the control parameter can be controlled at about 100, so as to retain image characteristics of most sub-picture video images having similar styles, and to merely adapt image characteristics of few sub-picture video images having dissimilar styles to the whole picture characteristics.

As can be known from the aforementioned embodiment according to the present invention, since the present invention separately calculates adjustment coefficients with respect to the various independent sub-picture video images according to identical control parameters, after equalization by means of the adjustment coefficients and the identical control parameters, it is possible to uniformly adjust the various sub-picture video images to the effect of having the same image characteristics, so that the sub-picture video images exhibit identical picture characteristics during display, to thereby achieve harmony in whole style during display of a multi-picture video image formed by the sub-picture video images, and to improve visual experience of the conventioneers.

Figure 4:
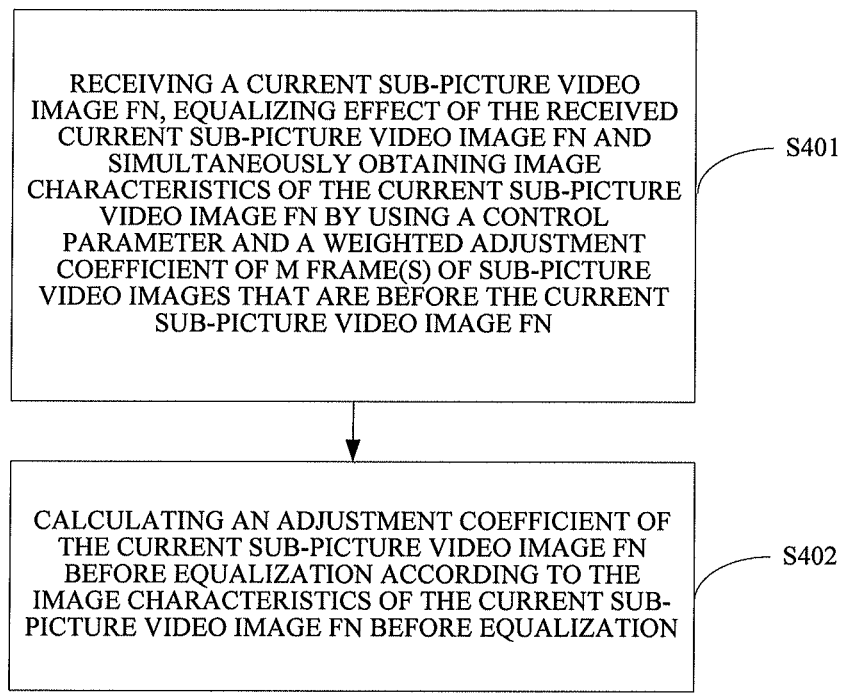
FIG. 4 is a flowchart exemplarily illustrating the effect method provided by Embodiment 4 of the present invention of using control parameters respectively to equalize sub-picture video images from several channels.

Referring to FIG. 4, which is a basic flowchart exemplarily illustrating the effect method provided by Embodiment 4 of the present invention of using control parameters respectively to equalize sub-picture video images from several channels, the method mainly comprises the following steps.

S401—receiving a current sub-picture video image Fn, equalizing effect of the received current sub-picture video image Fn and simultaneously obtaining image characteristics of the current sub-picture video image Fn by using a control parameter and a weighted adjustment coefficients of m frame(s) sub-picture video images that are before the current sub-picture video image Fn.

Since video images usually assume a kind of temporal similarity in time, especially so in a videoconference, where the environment of an inputted video image is essentially fixed, and temporal similarity thereof is very high; that is to say, image characteristics of the current frame of sub-picture video image are extremely similar to image characteristics of the immediately following frame of sub-picture video image. Therefore, different from the use of a control parameter to equalize the current sub-picture video image as provided by Embodiment 2 of the present invention, it is possible in this embodiment to use a control parameter and a weighted adjustment coefficient of m frame(s) of sub-picture video images that are before the current sub-picture video image Fn to equalize effect of the received current sub-picture video image Fn and simultaneously obtain image characteristics of the current sub-picture video image Fn.

While calculating the weighted adjustment coefficient of the m (which is a natural number greater than or equal to 1) frames of sub-picture video images that are before the current sub-picture video image Fn, image characteristics of each frame of the m frame(s) of sub-picture video images are required as basis to weight adjustment coefficients of each frame of the m frame(s) of sub-picture video images that are before the current sub-picture video image Fn. Obtainment of the weighted adjustment coefficient of the m frame(s) of sub-picture video images that are before the current sub-picture video image Fn includes the following steps.

S4011—obtaining image characteristics of each frame of the m frame(s) of sub-picture video image that are before the current sub-picture video image Fn.

In this embodiment, obtainment of image characteristics of each frame of the m frame of sub-picture video images that are before the current sub-picture video image Fn is similar to obtainment of the image characteristics of the current sub-picture video image Fn in Embodiment 1 of the present invention. For instance, out of considerations for simplicity and easy realization, the histogram statistical method can also be used to make statistics about pixel points with luminance values within an interval [Slum, Tlum] in each frame of the m frame of sub-picture video image that are before the current sub-picture video image Fn, where Slum is greater than or equal to 0, Tlum is smaller than or equal to Lm, and Lm is identically defined as in the foregoing embodiment, namely the maximum value used to describe luminance standard. For instance, with respect to a typical representation method where a decimal system corresponding to 8 bits is used to describe luminance values, Lm can be set as 255 to correspond to the maximum value used to describe luminance standard; with respect to a representation method where a decimal system corresponding to 16 bits is used to describe luminance values, Lm can be set as 65535 to correspond to the maximum value used to describe luminance standard. The present invention does not make any restriction thereto.

Thereafter, it is possible to construct a pixel point-luminance value statistical chart of each frame of the m frame(s) of sub-picture video image that are before the current sub-picture video image Fn from pixel points with luminance values within the interval [Slum, Tlum] and luminance values, to which the pixel points correspond, and luminance characteristics of each frame of m frame(s) of sub-picture video images that are before the current sub-picture video image Fn can be determined from the pixel point-luminance value statistical chart. For instance, suppose that luminance values of great quantities of pixel points (exceeding 80% of the total pixel points, for example) in the pixel point-luminance value statistical chart are smaller than the luminance value (of 100, for example) of a frame of video image having normal luminance, it is determinable that the luminance characteristics of each frame of m frame(s) of sub-picture video images that are before the current sub-picture video image Fn indicate that "the image is relatively dark", and it is necessary to adequately increase the luminance of the sub-picture video image by certain means; to the contrary, if luminance values of great quantities of pixel points (exceeding 80% of the total pixel points, for example) in the pixel point-luminance value statistical chart are greater than the luminance value (of 100, for example) of a frame of video image having normal luminance, it is determinable that the luminance characteristics of the sub-picture video image indicate that "the image is relatively bright", and it is necessary to adequately decrease the luminance of the sub-picture video image by certain means.

Likewise, it is also possible to use the histogram statistical method to make statistics about pixel points with chroma values within a certain range in each frame of m frame(s) of sub-picture video images that are before the current sub-picture video image Fn to determine the chroma characteristics of each frame of m frame(s) of sub-picture video images that are before the current sub-picture video image Fn. For instance, the chroma characteristics of the sub-picture video image are determined by making statistics about pixel points with chroma red (CR) values or chroma blue (CB) values within a certain range in each frame of m frame(s) of sub-picture video images that are before the current sub-picture video image Fn. Since the white color is a basic color and has a relatively large luminance value of usually 200 and more (a value determined when a decimal system corresponding to 8 bits is used to represent chroma values), for example, different from the statistics about the luminance values of images, statistics about CR values or CB values in the embodiments of the present invention is so carried out that pixel points with chroma values close to chroma values of a white region in each frame of m frame(s) of sub-picture video images that are before the current sub-picture video image Fn are made statistics about, a pixel point-chroma value statistical chart is constructed from the pixel points with chroma values close to the chroma values of the white region and the corresponding chroma values thereof, and the chroma characteristics of each frame of m frame(s) of sub-picture video images that are before the current sub-picture video image Fn are then determined from the pixel point-chroma value statistical chart.

For instance, for the white region, both the CR values and CB values are close to 128 (a value determined when a decimal system corresponding to 8 bits is used to represent chroma values); in view thereof, it is possible in the embodiments of the present invention to make statistics about pixel points with chroma values within [128−T2, 128+T2]. Since T2 is a relatively small value (smaller than or equal to 10, for example), pixel points with chroma values within [128−T2, 128+T2] are precisely the pixel points close to chroma values of the white region. Accordingly, if chroma values (CR values or CB values) of most pixel points in the pixel point-chroma value statistical chart constructed by making statistics about the pixel points with chroma values close to chroma values of the white region in each frame of m frame(s) of sub-picture video images that are before the current sub-picture video image Fn are smaller or greater than 128, it is determinable that the chroma characteristics of each frame of m frame(s) of sub-picture video images that are before the current sub-picture video image Fn indicate chroma offset, for example, offset to blue, offset to green or offset to red, etc., and it is necessary to adequately adjust the chroma of each frame of m frame(s) of sub-picture video images that are before the current sub-picture video image Fn through certain means.

S4012—calculating the weighted adjustment coefficient of the m frame(s) of sub-picture video images that are before the current sub-picture video image Fn according to the control parameter and the image characteristics of each frame of m frame(s) of sub-picture video images that are before the current sub-picture video image Fn.

In this embodiment, the weighted adjustment coefficient of the m frame(s) of sub-picture video images that are before the current sub-picture video image Fn is calculated and obtained by weighting the adjustment coefficients of each of the m frame(s) of sub-picture video images that are before the current sub-picture video image Fn.

For instance, it is possible to calculate a first luminance weighted adjustment coefficient C'L1 and a second luminance weighted adjustment coefficient C'L2 of the m frame of sub-picture video images that are before the current sub-picture video image Fn, according to the control parameter and the image characteristics of each frame of m frame(s) of sub-picture video images that are before the current sub-picture video image Fn. The control parameter can be a reference value L'o used to equalize each frame of m frame(s) of sub-picture video images that are before the current sub-picture video image Fn to a target luminance value, and is used to guarantee that the current sub-picture video image Fn is neither brighter nor darker after modification. Calculation of the first luminance weighted adjustment coefficient C'L1 and the second luminance weighted adjustment coefficient C'L2 of the m frame(s) of sub-picture video images that are before the current sub-picture video image Fn includes the following steps.

S40121—counting, from a pixel point with a pixel value, of Spix of pixel points with pixel values within an interval [Spix, Tpix] in the pixel point-luminance value statistical chart of each frame of m frame(s) of sub-picture video image before the current sub-picture video image Fn, wherein the Spix and Tpix are respectively equal to the Slum and Tlum in numerical value.

S40122—obtaining a pixel value $P_{0j}'$ of a $Q^{th}$ pixel point when counting to the $Q^{th}$ pixel point for a $j^{th}$ sub-picture video image in the m frame(s) of sub-picture video image(s), wherein j is 1, 2, . . . m.

Preferably, for the $j^{th}$ sub-picture video image in the m frame(s) of sub-picture video image(s), it is possible to obtain a pixel value $P_{0j}'$ of an $Nj/2^{th}$ pixel point when counting to the half of the pixel points in the pixel point-luminance value statistical chart of the $j^{th}$ sub-picture video image, namely when counting to the $Nj/2^{th}$ (when Nj/2 is not an integer, Nj/2 can be rounded up to the closest integer) pixel point, wherein Nj represents the number of pixel points in the pixel point-luminance value statistical chart of the $j^{th}$ sub-picture video image, namely the number of pixel point samples about which statistics is made in the pixel point-luminance value statistical chart.

S40123—summing $P_{0j}'$ to obtain $$P'0 = \sum_{j=1}^{m} \frac{P'_{0,j}}{m}.$$

S40124—calculating to obtain a first luminance weighted adjustment coefficient C'L1 and a second luminance weighted adjustment coefficient C'L2 from the Spix, Tpix, P'0 and L'o, wherein both the first luminance weighted adjustment coefficient C'L2 and the second luminance weighted adjustment coefficient C'L2 are of a linear relationship to the L'o.

For instance, it is possible to calculate to obtain from Spix, Tpix, P'0 and L'o the first luminance weighted adjustment coefficient C'L1 as L'o/(P'0−Spix), wherein $$P'0 = \sum_{j=1}^{m} \frac{P'_{0j}}{m},$$

and to calculate to obtain the second luminance weighted adjustment coefficient C'L2 as L'o/(Tpix−P'0), wherein likewise $$P'0 = \sum_{j=1}^{m} \frac{P'_{0j}}{m},$$

and it is obvious that both C'L1 and C'L2 are of a linear relationship to L'o.

For instance, if the reference value L'o used to equalize each of the m frame(s) of sub-picture video images that are before the current sub-picture video image Fn to the target luminance value is 128, there are Nj' pixel points in the pixel point-luminance value statistical chart of the $j^{th}$ frame of the m frame(s) of sub-picture video images that are before the current sub-picture video image Fn, the pixel values thereof are within [0, 255] (255 is the maximum pixel value determined when a decimal system corresponding to 8 bits is used to represent pixel values), and counting begins from the pixel point with the pixel value of 0 for the $j^{th}$ sub-picture video image. The pixel value $P_{0j}'$ of the $Nj'/2^{th}$ pixel point is obtained when counting to the $Nj'/2^{th}$ pixel point (namely the half of the pixel points in the pixel point-luminance value statistical chart of the $j^{th}$ sub-picture video image). The pixel value $P_{oj}'$ is within the interval [0, 255].

$$\sum_{j=1}^{m} \frac{P'_{0j}}{m}$$

is calculated to obtain $$P'0 = \sum_{j=1}^{m} \frac{P'_{0j}}{m},$$

128/P'0 is calculated to obtain the first luminance weighted adjustment coefficient of the m frame(s) of sub-picture video images that are before the current sub-picture video image Fn as $$C'L1 = 128 \bigg/ \left(\sum_{j=1}^{m} \frac{P'_{0j}}{m}\right),$$

and 128/(255−P'0) is calculated to obtain the second luminance weighted adjustment coefficient of the m frame of sub-picture video images that are before the current sub-picture video image Fn as $$C'L2 = 128 \bigg/ \left(255 - \left(\sum_{j=1}^{m} \frac{P'_{0j}}{m}\right)\right).$$

Likewise, for the chroma of the current sub-picture video image Fn, it is also possible to calculate a first chroma weighted adjustment coefficient C'C1 and a second chroma weighted adjustment coefficient C'C2 of the current sub-picture video image Fn according to the image characteristics of each frame of m frame(s) of sub-picture video images that are before the current sub-picture video image Fn and a pre-determined or preset control parameter. The control parameter can be a reference value C'o used to equalize the current sub-picture video image to a target chroma value, and is used to guarantee that the current sub-picture video image Fn has no color offset after modification. Calculation of the first chroma weighted adjustment coefficient C'C1 and the second chroma weighted adjustment coefficient C'C2 of the m frame(s) of sub-picture video images that are before the current sub-picture video image Fn includes the following steps.

S'40121—counting, from a pixel point with a pixel value of Upix, of pixel points with pixel values within an interval [Upix, Vpix] in the pixel point-chroma value statistical chart of each frame of sub-picture video image in the m frame(s) of sub-picture video image(s), where Upix is greater than or equal to 0, Vpix is smaller than or equal to Y, and Y is the maximum value used to describe pixel value standard.

S'40122—obtaining a pixel value $P_{1k}'$ of a $W^{th}$ pixel point when counting to the $W^{th}$ pixel point for a $k^{th}$ sub-picture video image in m frames of sub-picture video images, wherein k is 1, 2, . . . m.

Preferably, for the $k^{th}$ sub-picture video image in the m frame(s) of sub-picture video image(s), it is possible to obtain a pixel value $P_{1k}'$ of an $Nk/2^{th}$ pixel point when counting to the half of the pixel points in the pixel point-luminance value statistical chart of the $k^{th}$ sub-picture video image, namely when counting to the $Nk/2^{th}$ (when Nk/2 is not an integer, Nk/2 can be rounded up to the closest integer) pixel point, wherein Nk represents the number of pixel points in the pixel point-luminance value statistical chart of the $k^{th}$ sub-picture video image, namely the number of pixel point samples about which statistics is made in the pixel point-luminance value statistical chart.

S'40123—summing $P_{1k}'$ to obtain $$P'1 = \sum_{k=1}^{m} \frac{P'_{1k}}{m}.$$

S'40124—calculating to obtain a first chroma weighted adjustment coefficient C'C1 and a second chroma weighted adjustment coefficient C'C2 from the Upix, Vpix, P'1 and C'o, wherein both the first chroma weighted adjustment coefficient C'C1 and the second chroma weighted adjustment coefficient C'C2 are of a linear relationship to the C'o.

For instance, when the preferred embodiment is used in S'40122, it is possible to calculate to obtain from Upix, Vpix, P'1 and C'o the first chroma weighted adjustment coefficient C'C1 as C'o/(P'1−Upix), wherein $$P'1 = \sum_{k=1}^{m} \frac{P'_{1k}}{m},$$

and to calculate to obtain the second chroma weighted adjustment coefficient C'C2 as C'o/(Vpix−P'1), wherein likewise $$P'1 = \sum_{k=1}^{m} \frac{P'_{1k}}{m},$$

and it is obvious that both C'C1 and C'C2 are of a linear relationship to C'o.

For instance, if the reference value C'o used to equalize each of the m frame(s) of sub-picture video images that are before the current sub-picture video image Fn to the target chroma value is 128, there are Nk' pixel points in the pixel point-chroma value statistical chart of the $k^{th}$ frame of the m frame(s) of sub-picture video images that are before the current sub-picture video image Fn, the pixel values thereof are within [0, 255] (255 is the maximum pixel value determined when a decimal system corresponding to 8 bits is used to represent pixel values). Counting begins from the pixel point with the pixel value of 0 for the $k^{th}$ sub-picture video image. The pixel value $P_{1k}'$ of the Nk'/$2^{th}$ pixel point is obtained when counting to the Nk'/$2^{th}$ pixel point. The pixel value $P_{1k}'$ is within the interval [0, 255].

$$\sum_{k=1}^{m} \frac{P'_{1k}}{m}$$

is calculated to obtain $$P'1 = \sum_{k=1}^{m} \frac{P'_{1k}}{m},$$

128/P'1 is calculated to obtain the first chroma weighted adjustment coefficient of the current sub-picture video image Fn as $$C'C1 = 128 \bigg/ \left( \sum_{k=1}^{m} \frac{P'_{1k}}{m} \right),$$

and 128/(255−P'0) is calculated to obtain the second luminance weighted adjustment coefficient of the sub-picture video images that are m frame(s) before the current sub-picture video image Fn as $$C'L2 = 128 \bigg/ \left( 255 - \left( \sum_{k=1}^{m} \frac{P'_{1k}}{m} \right) \right).$$

Different from the use in Embodiment 2 of the present invention of the adjustment coefficient of the current sub-picture video image Fn to equalize the effect of the current sub-picture video image Fn, this embodiment uses the adjustment coefficient of a sub-picture video image Fn−1 that is m frame(s) before the current sub-picture video image Fn to equalize the effect of the current sub-picture video image Fn. For instance, equalization of the luminance of the current sub-picture video image Fn includes the following steps.

S11—making statistics about pixel points with luminance values in the current sub-picture video image Fn within an interval [Mlum, Nlum], where Mlum is greater than or equal to 0, Nlum is smaller than or equal to Lm, and Lm is the maximum value used to describe luminance standard.

S12—constructing a pixel point-luminance value statistical chart of the current sub-picture video image Fn from the pixel points within the interval [Mlum, Nlum] and the luminance values to which the pixel points correspond.

S13—counting, from a pixel point with a pixel value of Mpix, of pixel points with pixel values within an interval [Mpix, Npix] in the pixel point-luminance value statistical chart of the current sub-picture video image Fn, and obtaining a pixel value P2 of a $P^{th}$ pixel point while counting to the $P^{th}$ pixel point, wherein the Mpix and Npix are respectively equal to the Mlum and Nlum in numerical value.

Preferably, for pixel points within the interval [Mpix, Npix], it is possible to obtain a pixel value P2 of an N/$2^{th}$ pixel point when counting to the half of the pixel points in the pixel point-luminance value statistical chart, namely when counting to the N/$2^{th}$ (when N/2 is not an integer, N/2 can be rounded up to the closest integer) pixel point, wherein N represents the number of pixel points in the pixel point-luminance value statistical chart of the current sub-picture video image, namely the number of pixel point samples about which statistics is made in the pixel point-luminance value statistical chart.

S14—linearly modifying luminance values of pixel points with pixel values within an interval [Mpix, P2] by using the reference value Lo and the first luminance weighted adjustment coefficient C'L1, and obtaining a luminance value L'1 of the current sub-picture video image within the interval [Mpix, P2]; and linearly modifying luminance values of pixel points with pixel values within an interval [P2, Npix] by using the reference value Lo and the second luminance weighted adjustment coefficient C'L2, and obtaining a luminance value L'2 of the current sub-picture video image within the interval [P2, Npix].

For instance, if the first luminance weighted adjustment coefficient C'L1 calculated in the foregoing embodiment is L'o/(P'O−Spix), when the luminance effect of the current sub-picture video image is equalized, it is possible to modify the luminance values of pixel points within the interval [Mpix, P2] in the current sub-picture video image as C'L1×(P−Mpix) and then output the result, and to modify the luminance values of pixel points within the interval [P2, Npix] in the current sub-picture video image as Nlum−(C'L2×(Npix−P)) and then output the result, wherein P is the pixel value of the pixel points in the current sub-picture video image before equalization.

Equalization of the chroma of the current sub-picture video image Fn includes the following steps.

S'11—making statistics about pixel points with chroma values close to chroma values of a white region in the current sub-picture video image Fn.

S'12—constructing a pixel point-chroma value statistical chart of the current sub-picture video image Fn from the pixel points with chroma values close to chroma values of the white region and the corresponding chroma values thereof.

S'13—counting, from a pixel point with a pixel value of Xpix, of pixel points with pixel values within an interval [Xpix, Ypix] in the pixel point-chroma value statistical chart of the current sub-picture video image Fn, and obtaining a pixel value P3 of a $T^{th}$ pixel point while counting to the $T^{th}$ pixel point, wherein Xpix is greater than or equal to 0, Ypix is smaller than or equal to Y, and Y is the maximum value used to describe pixel value standard.

Preferably, for pixel points within the interval [Xpix, Ypix], it is possible to obtain a pixel value P3 of an $M/2^{th}$ pixel point when counting to the half of the pixel points in the pixel point-chroma value statistical chart, namely when counting to the $M/2^{th}$ (when M/2 is not an integer, M/2 can be rounded up to the closest integer) pixel point, wherein M represents the number of pixel points in the pixel point-chroma value statistical chart of the current sub-picture video image, namely the number of pixel point samples about which statistics is made in the pixel point-chroma value statistical chart.

S'14—linearly modifying chroma values of pixel points with pixel values within an interval [Xpix, P3] by using the reference value C'o and the first chroma weighted adjustment coefficient C'C1, and obtaining a chroma value C'1 of the current sub-picture video image within the interval [Xpix, P3]; and linearly modifying chroma values of pixel points with pixel values within an interval [P3, Ypix] by using the reference value C'o and the second chroma weighted adjustment coefficient C'C2, and obtaining a chroma value C'2 of the current sub-picture video image within the interval [P3, Ypix].

For instance, if the first chroma weighted adjustment coefficient C'C1 calculated in the foregoing embodiment is C'o/(P'1−Upix) and the second luminance adjustment coefficient CC2 is C'o/(Vpix−P'1), when the chroma effect of the current sub-picture video image is equalized, it is possible to modify the chroma values of pixel points within the interval [Xpix, P3] in the current sub-picture video image as C'C1×(P−Xpix) and then output the result, and to modify the chroma values of pixel points within the interval [P3, Ypix] in the current sub-picture video image as Ychr−(C'C2×(Ypix−P)) and then output the result, wherein P is the pixel value of the pixel points in the current sub-picture video image before equalization, and Ychr is the chroma value of pixel points with pixel values within the interval [Xpix, Ypix], and is equivalent to Ypix in numerical value.

As should be noted, obtainment of image characteristics of the current sub-picture video image Fn in this embodiment is similar to obtainment of the image characteristics of the current sub-picture video image Fn in Embodiment 1 of the present invention. For instance, obtainment of luminance characteristics of the current sub-picture video image Fn includes the following steps:

making statistics about pixel points with luminance values in the current sub-picture video image Fn within an interval [Alum, Blum], where Alum is greater than or equal to 0, Blum is smaller than or equal to Lm, and Lm is the maximum value used to describe luminance standard;

constructing a pixel point-luminance value statistical chart of the Fn from the pixel points within the interval [Alum, Blum] and the luminance values to which the pixel points correspond; and determining luminance characteristics of the current sub-picture video image Fn from the pixel point-luminance value statistical chart.

Obtainment of chroma characteristics of the current sub-picture video image Fn includes the following steps:

making statistics about pixel points with chroma values close to chroma values of a white region in the current sub-picture video image Fn;

constructing a pixel point-chroma value statistical chart of the Fn from the pixel points with chroma values close to chroma values of the white region and the corresponding chroma values thereof; and determining chroma characteristics of the current sub-picture video image Fn from the pixel point-chroma value statistical chart.

S402—calculating an adjustment coefficient of the current sub-picture video image Fn before equalization according to the image characteristics of the current sub-picture video image Fn before equalization.

To calculate the adjustment coefficient of the current sub-picture video image before equalization Fn is to weight this adjustment coefficient together with adjustment coefficients of sub-picture video images before the current sub-picture video image Fn for use in a sub-picture video image Fn+1 next to the current sub-picture video image Fn, so that steps S401 and S402 can be cyclically carried out.

Calculation of the luminance adjustment coefficients and chroma adjustment coefficients of the current sub-picture video image Fn before equalization is completely the same as that of Embodiment 2 of the present invention (see the foregoing embodiments), and is hence not redundantly described here.

As can be known from the use of control parameters to respectively equalize the effect of sub-picture video images from several channels as provided by Embodiment 4 of the present invention, since the present invention separately calculates adjustment coefficients with respect to the various independent sub-picture video images according to identical control parameters, after equalization by means of the adjustment coefficients and the identical control parameters, it is possible to uniformly adjust the various sub-picture video images to the effect of having the same image characteristics, so that the sub-picture video images exhibit identical picture characteristics during display, to thereby achieve harmony in whole style during display of a multi-picture video image formed by the sub-picture video images, and to improve visual experience of the conventioneers.

As should be explained, although the aforementioned embodiments are all directed to a single channel sub-picture video image to explain how to use control parameters to equalize effect thereof, it is comprehensible to persons skilled in the art that the methods provided by the embodiments of the present invention can be used separately to equalize sub-picture video images from several channels, and can also be used in combination to equalize sub-picture video images from several channels.

Figure 5:
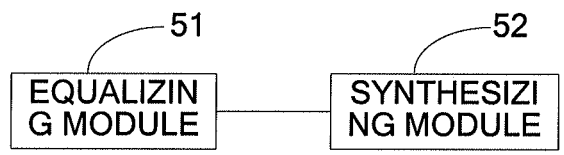
FIG. 5 is a view exemplarily illustrating the structure of the device provided by Embodiment 5 of the present invention for processing a multi-picture video image.

Refer to FIG. 5, which is a view exemplarily illustrating the structure of the device provided by Embodiment 5 of the present invention for processing a multi-picture video image. To facilitate explanation, shown are only those parts that are relevant to the embodiments of the present invention. Functional modules included in the device may be software modules, hardware modules, and modules in which software is combined with hardware.

An equalizing module 51 is used for receiving a data code stream of sub-picture video images from several channels, and equalizing effect of the sub-picture video images from several channels with control parameters respectively according to image characteristics of the sub-picture video images.

A synthesizing module 52 is used for synthesizing the sub-picture video images equalized by the equalizing module 51 to a multi-picture video image.

Figure 6:
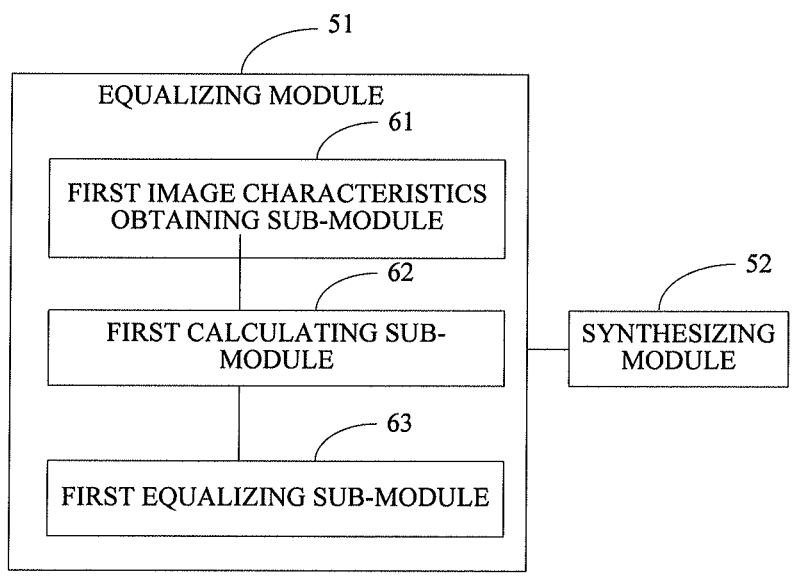
FIG. 6 is a view exemplarily illustrating the structure of the device provided by Embodiment 6 of the present invention for processing a multi-picture video image.

The equalizing module 51 may further include a first image characteristics obtaining sub-module 61, a first calculating sub-module 62 and a first equalizing sub-module 63, as shown in FIG. 6, which is a view exemplarily illustrating the structure of the device provided by Embodiment 6 of the present invention, in which for processing a multi-picture video image:

the first image characteristics obtaining sub-module 61 is used for obtaining image characteristics of a current sub-picture video image;

the first calculating sub-module 62 is used for calculating an adjustment coefficient according to a control parameter and the image characteristics of the current sub-picture video image obtained by the first image characteristics obtaining sub-module 61; and the first equalizing sub-module 63 is used for equalizing effect of the current sub-picture video image by using the control parameter and the adjustment coefficient calculated by the first calculating sub-module 62.

Figure 7:
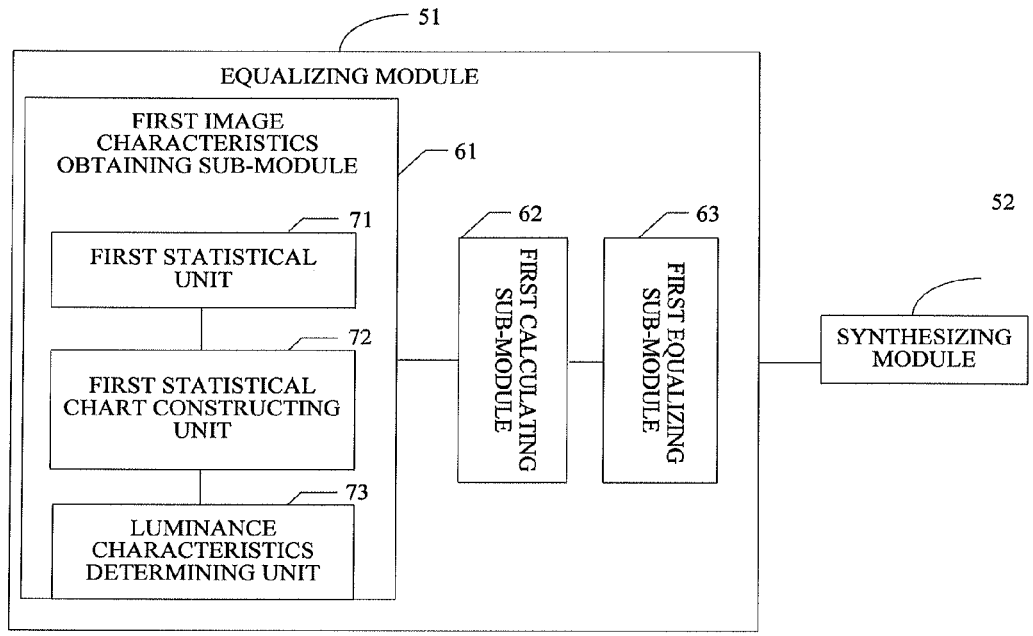
FIG. 7 is a view exemplarily illustrating the structure of the device provided by Embodiment 7 of the present invention for processing a multi-picture video image.

The first image characteristics obtaining sub-module 61 may further include a first statistical unit 71, a first statistical chart constructing unit 72 and a luminance characteristics determining unit 73, as shown in FIG. 7, which is a view exemplarily illustrating the structure of the device provided by Embodiment 7 of the present invention for processing a multi-picture video image, in which:

the first statistical unit 71 is used for making statistics about pixel points in the current sub-picture video image with luminance values within an interval [Alum, Blum], where Alum is greater than or equal to 0, Blum is smaller than or equal to Lm, and Lm corresponds to the maximum value used to describe luminance standard;

the first statistical chart constructing unit 72 is used for constructing a pixel point-luminance value statistical chart from the pixel points within the interval [Alum, Blum] and the luminance values to which the pixel points correspond; and the luminance characteristics determining unit 73 is used for determining luminance characteristics of the current sub-picture video image from the pixel point-luminance value statistical chart.

Figure 8:
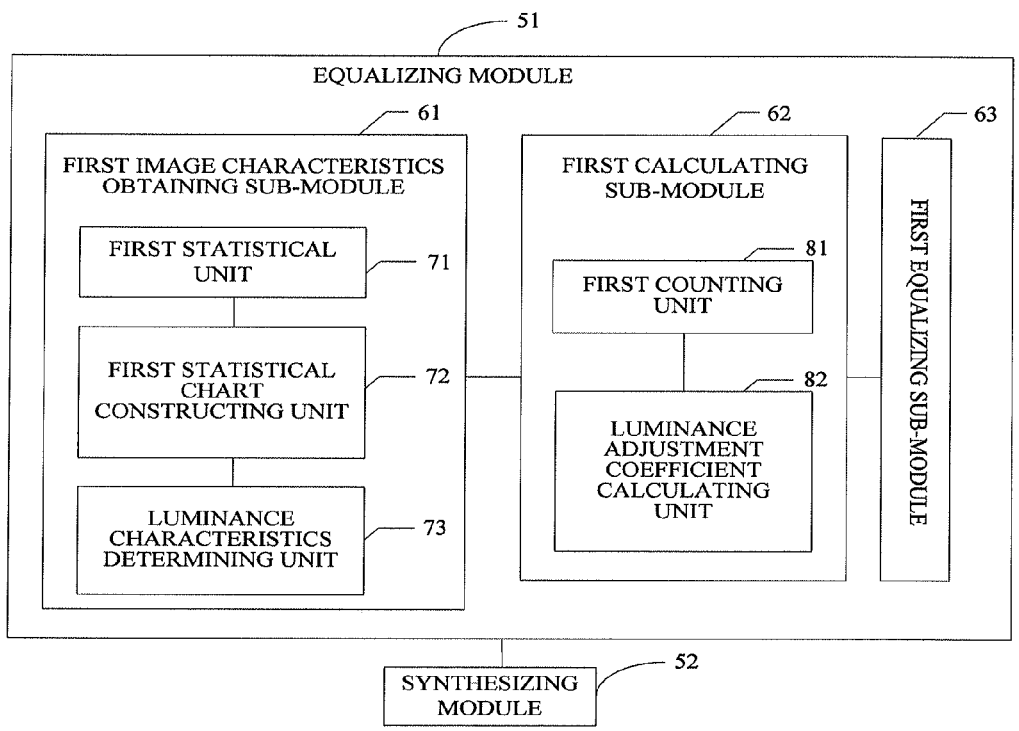
FIG. 8 is a view exemplarily illustrating the structure of the device provided by Embodiment 8 of the present invention for processing a multi-picture video image.

The first calculating sub-module 62 may further include a first counting unit 81 and a luminance adjustment coefficient calculating unit 82, as shown in FIG. 8, which is a view exemplarily illustrating the structure of the device provided by Embodiment 8 of the present invention for processing a multi-picture video image, in which:

the first counting unit 81 is used for counting, from a pixel point with a pixel value of Apix, of pixel points with pixel values within an interval [Apix, Bpix] in the pixel point-luminance value statistical chart, and obtaining a pixel value P0 of a $k^{th}$ pixel point when counting to the $k^{th}$ pixel point, wherein the Apix and Bpix are respectively equal to the Alum and Blum in numerical value; and the luminance adjustment coefficient calculating unit 82 is used for calculating to obtain a first luminance adjustment coefficient CL1 and a second luminance adjustment coefficient CL2 from the Apix, Bpix, P0 and Lo, wherein both the first luminance adjustment coefficient CL1 and the second luminance adjustment coefficient CL2 are of a linear relationship to the Lo.

Figure 9:
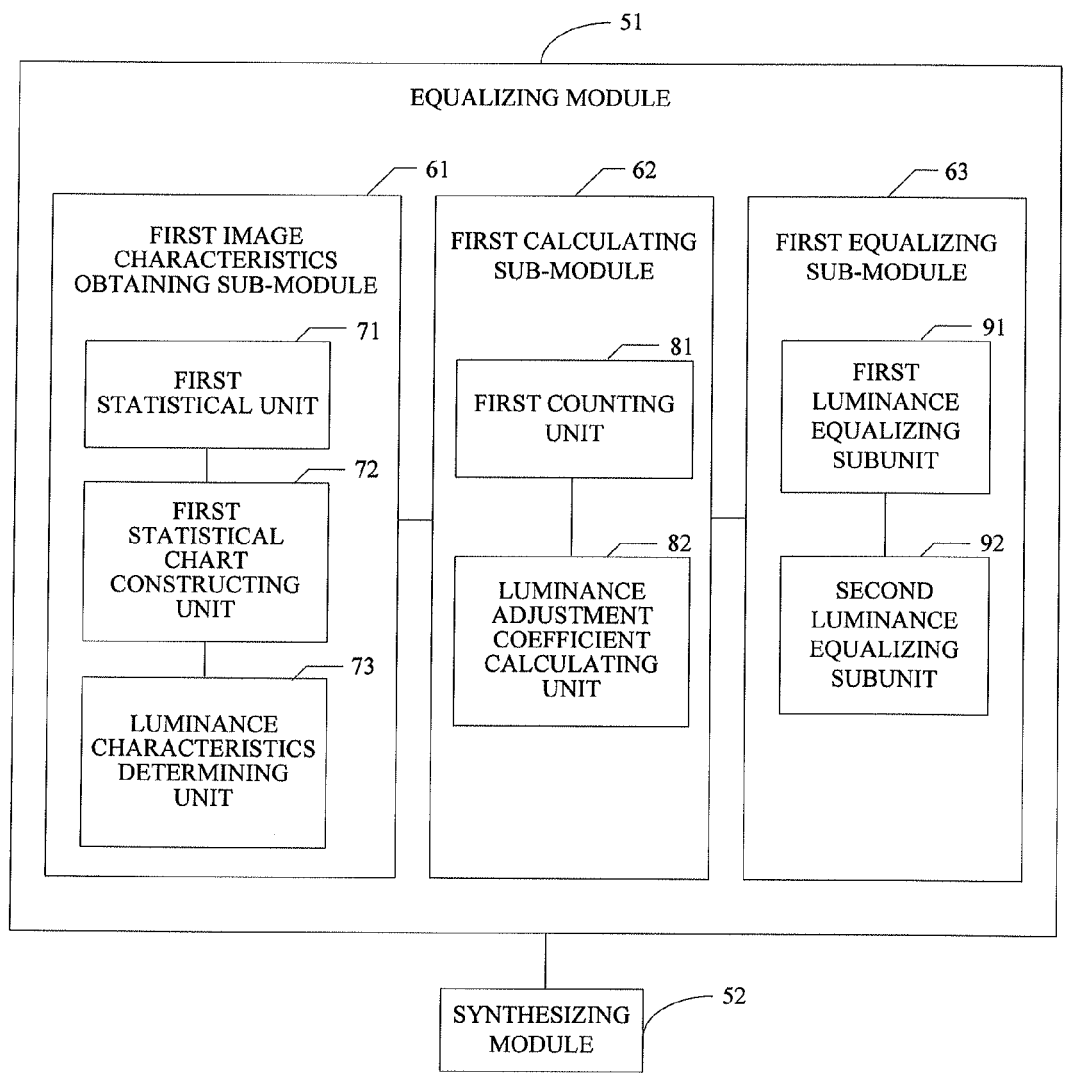
FIG. 9 is a view exemplarily illustrating the structure of the device provided by Embodiment 9 of the present invention for processing a multi-picture video image.

The first equalizing sub-module 63 may further include a first luminance equalizing subunit 91 and a second luminance equalizing subunit 92, as shown in FIG. 9, which is a view exemplarily illustrating the structure of the device provided by Embodiment 9 of the present invention for processing a multi-picture video image, in which:

the first luminance equalizing subunit 91 linearly modifies luminance values of pixel points with pixel values within an interval [Apix, P0] by using the reference value Lo and the first luminance adjustment coefficient CL1, and obtains a luminance value L1 of the current sub-picture video image within the interval [Apix, P0]; and the second luminance equalizing subunit 92 linearly modifies luminance values of pixel points with pixel values within an interval [P0, Bpix] by using the reference value Lo and the second luminance adjustment coefficient CL2, and obtains a luminance value L2 of the current sub-picture video image within the interval [P0, Bpix].

Figure 10:
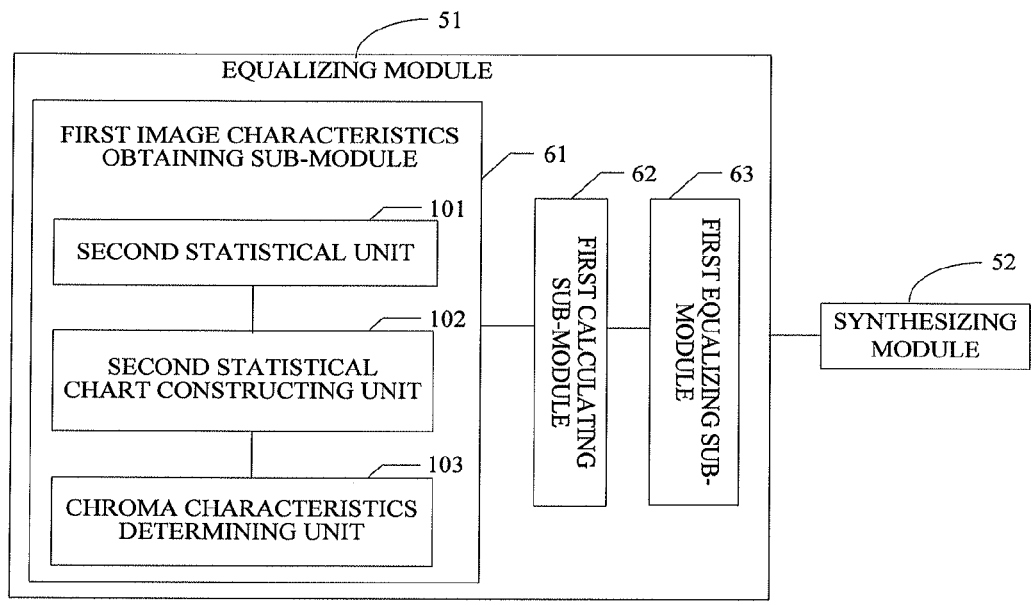
FIG. 10 is a view exemplarily illustrating the structure of the device provided by Embodiment 10 of the present invention for processing a multi-picture video image.

The first image characteristics obtaining sub-module 61 may further include a second statistical unit 101, a second statistical chart constructing unit 102 and a chroma characteristics determining unit 103, as shown in FIG. 10, which is a view exemplarily illustrating the structure of the device provided by Embodiment 10 of the present invention for processing a multi-picture video image, in which:

the second statistical unit 101 is used for making statistics about pixel points with chroma values close to chroma values of a white region in the current sub-picture video image;

the second statistical chart constructing unit 102 is used for constructing a pixel point-chroma value statistical chart from the pixel points with chroma values close to chroma values of the white region and the corresponding chroma values thereof; and the chroma characteristics determining unit 103 is used for determining chroma characteristics of the current sub-picture video image from the pixel point-chroma value statistical chart.

Figure 11:
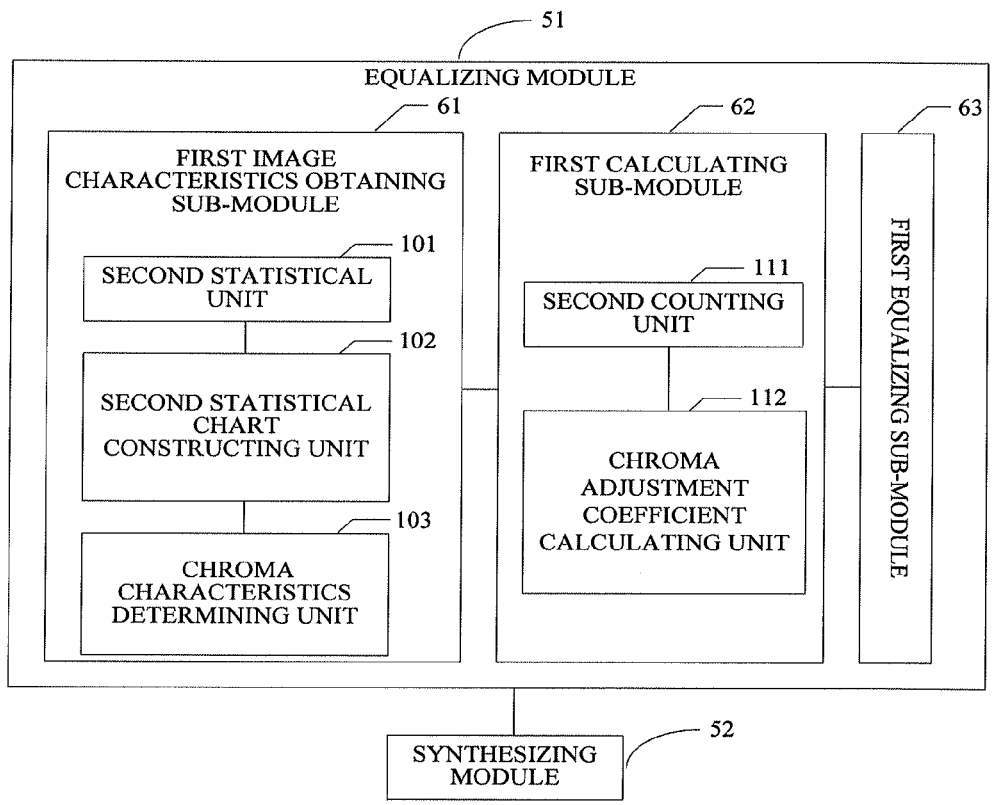
FIG. 11 is a view exemplarily illustrating the structure of the device provided by Embodiment 11 of the present invention for processing a multi-picture video image.

The first calculating sub-module 62 may further include a second counting unit 111 and a chroma adjustment coefficient calculating unit 112, as shown in FIG. 11, which is a view exemplarily illustrating the structure of the device provided by Embodiment 11 of the present invention for processing a multi-picture video image, in which:

the second counting unit 111 is used for counting, from a pixel point with a pixel value of Jpix, of pixel points with pixel values within an interval [Jpix, Kpix] in the pixel point-chroma value statistical chart, and obtaining a pixel value P1 of a $J^{th}$ pixel point when counting to the $J^{th}$ pixel point, wherein Jpix is greater than or equal to 0, Kpix is smaller than or equal to Y, and Y is the maximum value used to describe pixel value standard; and the chroma adjustment coefficient calculating unit 112 is used for calculating to obtain a first chroma adjustment coefficient CC1 and a second chroma adjustment coefficient CC2 from the Jpix, Kpix, P1 and Co, wherein both the first chroma adjustment coefficient CC1 and the second chroma adjustment coefficient CC2 are of a linear relationship to the Co.

Figure 12:
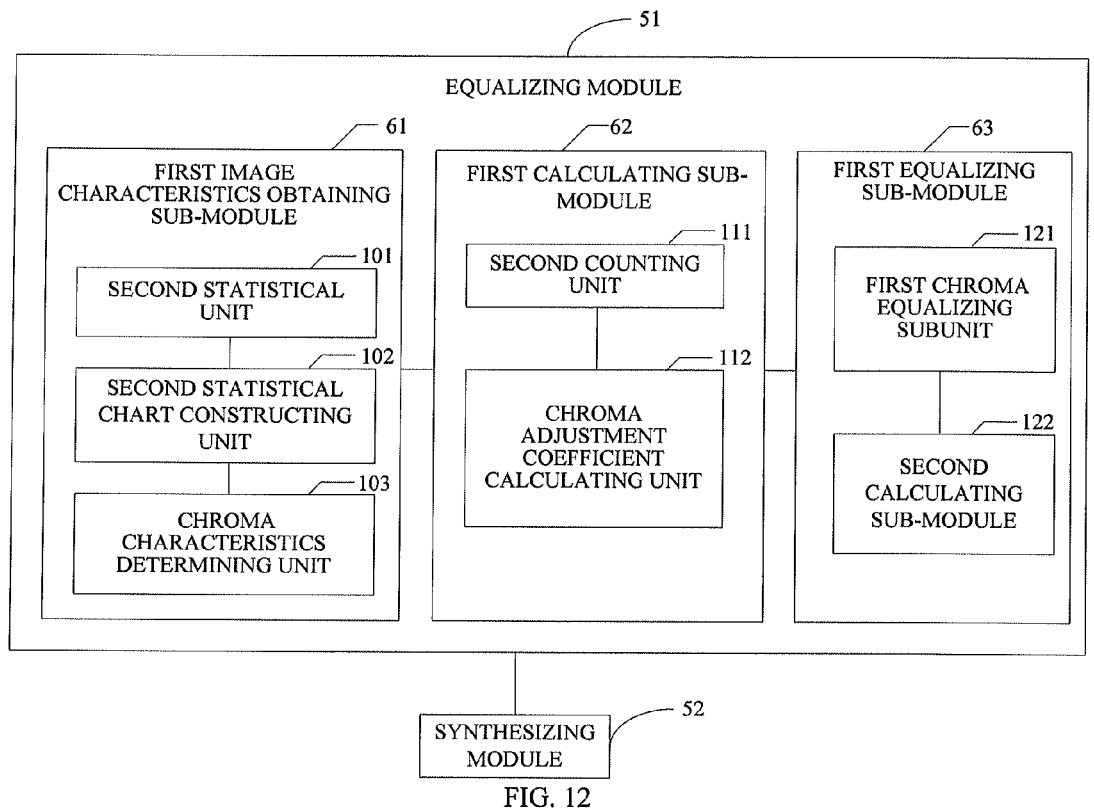
FIG. 12 is a view exemplarily illustrating the structure of the device provided by Embodiment 12 of the present invention for processing a multi-picture video image.

The first equalizing sub-module 63 may further include a first chroma equalizing subunit 121 and a second chroma equalizing subunit 122, as shown in FIG. 12, which is a view exemplarily illustrating the structure of the device provided by Embodiment 12 of the present invention for processing a multi-picture video image, in which:

the first chroma equalizing subunit 121 linearly modifies chroma values of pixel points with pixel values within an interval [Jpix, P1] by using the reference value Co and the first chroma adjustment coefficient CC1, and obtains a chroma value C1 of the current sub-picture video image within the interval [Jpix, P1]; and the second chroma equalizing subunit 122 linearly modifies chroma values of pixel points with pixel values within an interval [P1, Kpix] by using the reference value Co and the second chroma adjustment coefficient CC2, and obtains a chroma value C2 of the current sub-picture video image within the interval [P1, Kpix].

Figure 13:
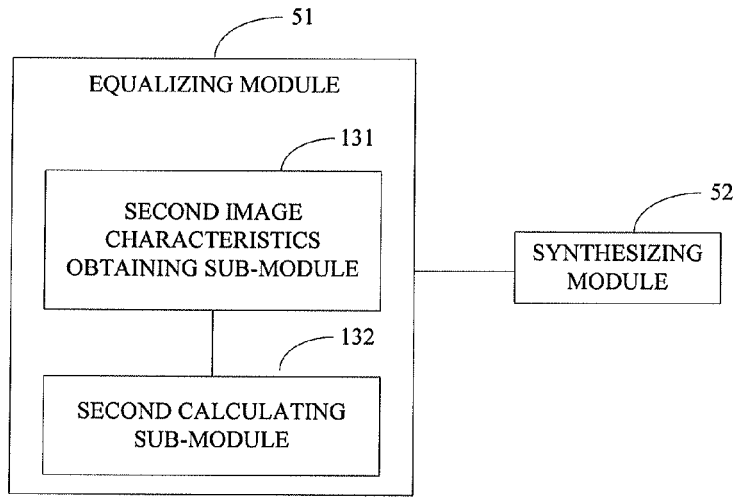
FIG. 13 is a view exemplarily illustrating the structure of the device provided by Embodiment 13 of the present invention for processing a multi-picture video image.

The equalizing module 51 may further include a second image characteristics obtaining sub-module 131 and a second calculating sub-module 132, as shown in FIG. 13, which is a view exemplarily illustrating the structure of the device provided by Embodiment 13 of the present invention for processing a multi-picture video image, in which:

the second image characteristics obtaining sub-module 131 is used for equalizing effect of a received current sub-picture video image Fn and obtaining image characteristics of the current sub-picture video image Fn by using a control parameter and a weighted adjustment coefficient of m frame of sub-picture video images that are before the current sub-picture video image Fn while receiving the current sub-picture video image Fn; and the second calculating sub-module 132 is used for calculating an adjustment coefficient of the current sub-picture video image Fn before equalization according to the image characteristics of the current sub-picture video image Fn before equalization obtained by the second image characteristics obtaining sub-module 131, where m is a natural number greater than or equal to 1.

Figure 14:
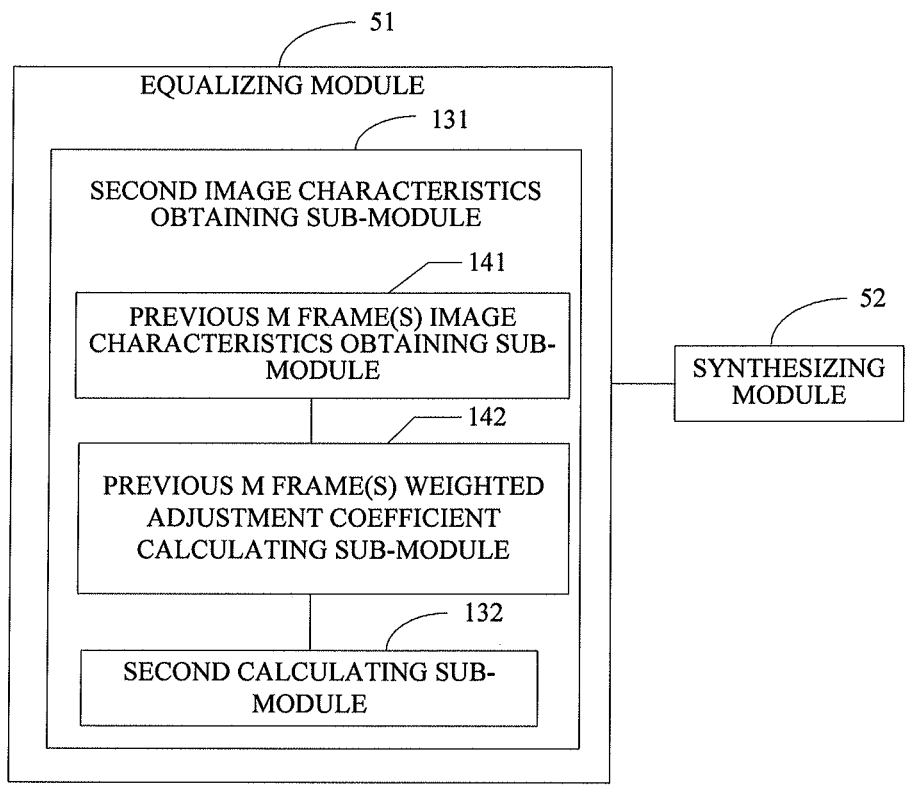
FIG. 14 is a view exemplarily illustrating the structure of the device provided by Embodiment 14 of the present invention for processing a multi-picture video image.

The second image characteristics obtaining sub-module 131 may further include a previous m frame(s) image characteristics obtaining sub-module 141 and a previous m frame(s) weighted adjustment coefficient calculating sub-module 142, as shown in FIG. 14, which is a view exemplarily illustrating the structure of the device provided by Embodiment 14 of the present invention for processing a multi-picture video image, in which:

the previous m frame(s) image characteristics obtaining sub-module 141 is used for obtaining image characteristics of each frame of m frame(s) of sub-picture video images that are before the current sub-picture video image Fn; and the previous m frame(s) weighted adjustment coefficient calculating sub-module 142 is used for calculating the weighted adjustment coefficient of the sub-picture video images that are m frame(s) before the Fn according to the control parameter and the image characteristics of each frame of m frame(s) of sub-picture video images that are before the current sub-picture video image Fn.

Figure 15:
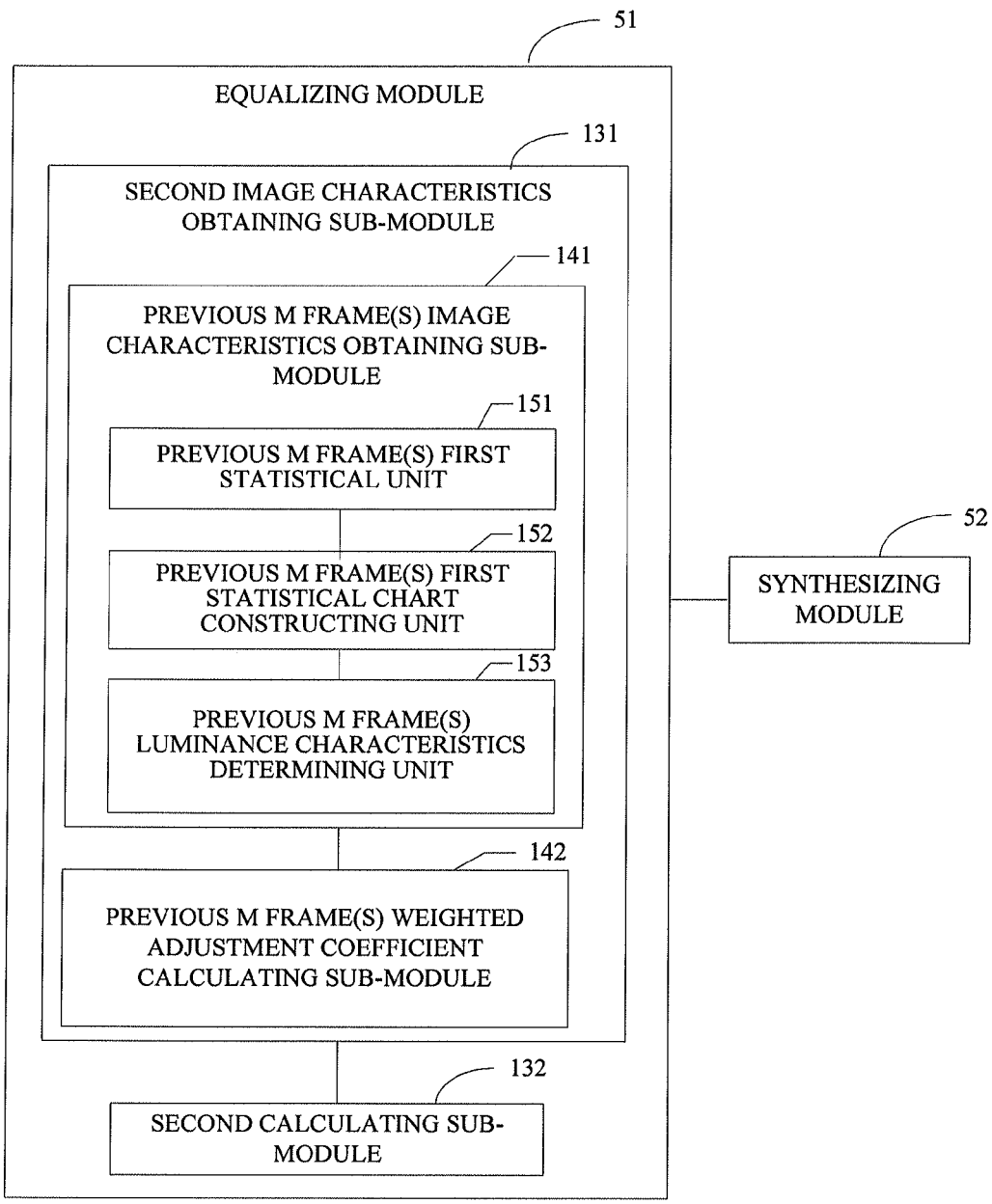
FIG. 15 is a view exemplarily illustrating the structure of the device provided by Embodiment 15 of the present invention for processing a multi-picture video image.

The previous m frame(s) image characteristics obtaining sub-module 141 may further include a previous m frame(s) first statistical unit 151, a previous m frame(s) first statistical chart constructing unit 152 and a previous m frame(s) luminance characteristics determining unit 153, as shown in FIG. 15, which is a view exemplarily illustrating the structure of the device provided by Embodiment 15 of the present invention for processing a multi-picture video image, in which:

the previous m frame(s) first statistical unit 151 is used for making statistics about pixel points in each frame of m frame(s) of sub-picture video images that are before the current sub-picture video image Fn with luminance values within an interval [Slum, Tlum], where Slum is greater than or equal to 0, Tlum is smaller than or equal to Lm, and Lm is the maximum value used to describe luminance standard;

the previous m frame(s) first statistical chart constructing unit 152 is used for constructing a pixel point-luminance value statistical chart of each frame of m frame(s) of sub-picture video images that are before the current sub-picture video image Fn from the pixel points with luminance values within the interval [Slum, Tlum] and the luminance values to which the pixel points correspond; and the previous m frame(s) luminance characteristics determining unit 153 is used for determining luminance characteristics of each frame of m frame(s) of sub-picture video images that are before the current sub-picture video image Fn from the pixel point-luminance value statistical chart.

Figure 16:
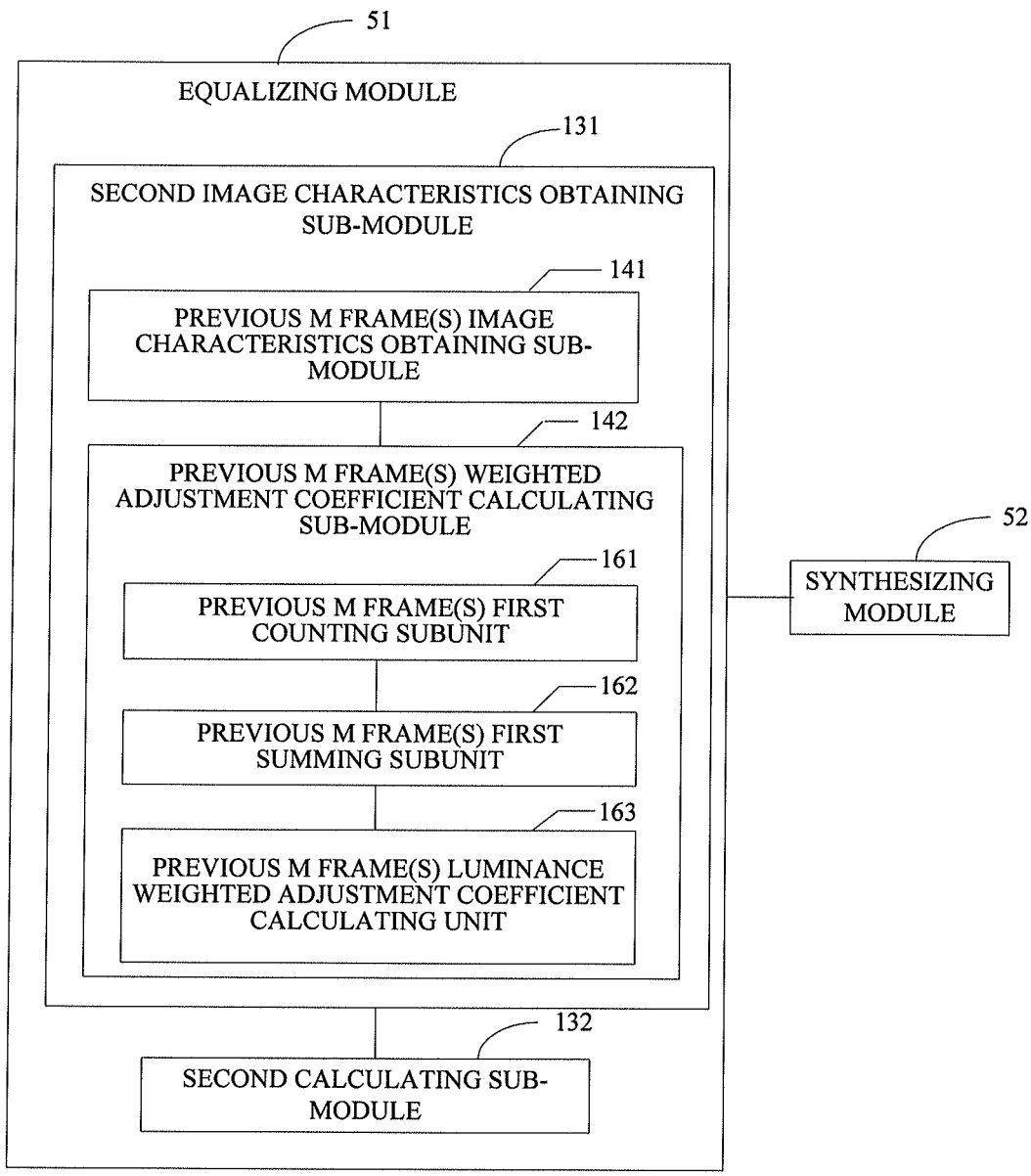
FIG. 16 is a view exemplarily illustrating the structure of the device provided by Embodiment 16 of the present invention for processing a multi-picture video image.

The previous m frame(s) weighted adjustment coefficient calculating sub-module 142 may further include a previous m frame(s) first counting subunit 161, a previous m frame(s) first summing subunit 162 and a previous m frame(s) luminance weighted adjustment coefficient calculating unit 163, as shown in FIG. 16, which is a view exemplarily illustrating the structure of the device provided by Embodiment 16 of the present invention for processing a multi-picture video image, in which:

the previous m frame(s) first counting subunit 161 is used for counting, from a pixel point with a pixel value of Spix, of pixel points with pixel values within an interval [Spix, Tpix] in the pixel point-luminance value statistical chart of each frame of sub-picture video image in the m frame(s) before the current sub-picture video frame, and obtaining a pixel value $P_{0j}'$ of a $Q^{th}$ pixel point when counting to the $Q^{th}$ pixel point for a $j^{th}$ sub-picture video image in m frame(s) of sub-picture video image(s) before the current sub-picture video image, wherein j is 1, 2, ... m, and the Spix and Tpix are respectively equal to the Slum and Tlum in numerical value;

the previous m frame(s) first summing subunit 162 is used for summing $P_{0j}'$ to obtain $$P'0 = \sum_{j=1}^{m} \frac{P'_{0j}}{m};$$

and the previous m frame(s) luminance weighted adjustment coefficient calculating unit 163 is used for calculating to obtain a first luminance weighted adjustment coefficient C'L1 and a second luminance weighted adjustment coefficient C'L2 from the Spix, Tpix, P'0 and L'o, wherein both the first luminance weighted adjustment coefficient C'L2 and the second luminance weighted adjustment coefficient C'L2 are of a linear relationship to the L'o.

Figure 17:
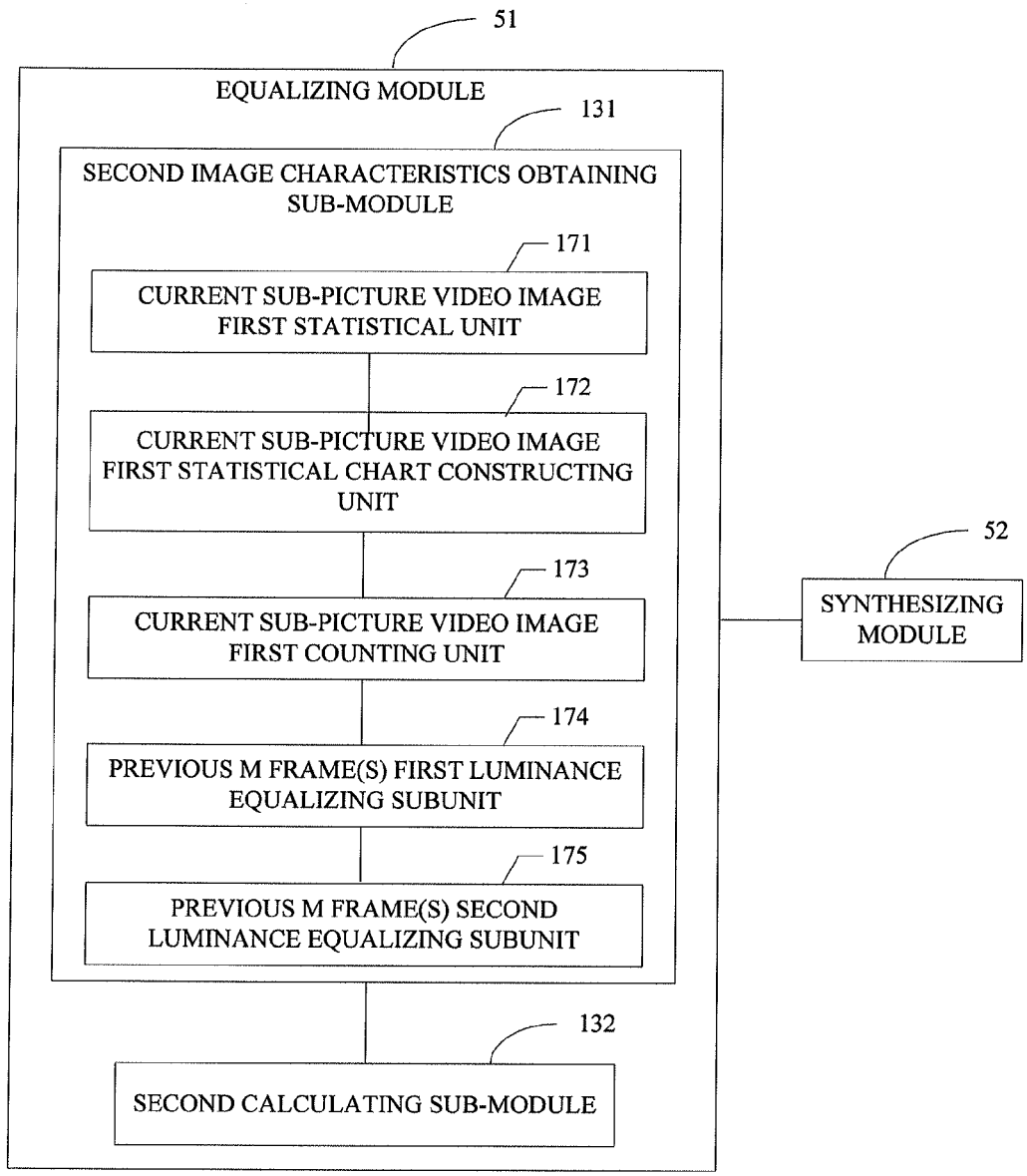
FIG. 17 is a view exemplarily illustrating the structure of the device provided by Embodiment 17 of the present invention for processing a multi-picture video image.

The second image characteristics obtaining sub-module 131 may include a current sub-picture video image first statistical unit 171, a current sub-picture video image first statistical chart constructing unit 172, a current sub-picture video image first counting unit 173, a previous m frame(s) first luminance equalizing subunit 174 and a previous m frame(s) second luminance equalizing subunit 175, as shown in FIG. 17, which is a view exemplarily illustrating the structure of the device provided by Embodiment 17 of the present invention for processing a multi-picture video image, in which:

the current sub-picture video image first statistical unit 171 is used for making statistics about pixel points in the current sub-picture video image Fn with luminance values within an interval [Mlum, Nlum], where Mlum is greater than or equal to 0, Nlum is smaller than or equal to Lm, and Lm is the maximum value used to describe luminance standard;

the current sub-picture video image first statistical chart constructing unit 172 is used for constructing a pixel point-luminance value statistical chart of the current sub-picture video image Fn from the pixel points within the interval [Mlum, Nlum] and the luminance values to which the pixel points correspond;

the current sub-picture video image first counting unit 173 is used for counting, from a pixel point with a pixel value of Mpix, of pixel points with pixel values within an interval [Mpix, Npix] in the pixel point-luminance value statistical chart of the current sub-picture video image Fn, and obtaining a pixel value P2 of a $P^{th}$ pixel point while counting to the $P^{th}$ pixel point, wherein the Mpix and Npix are respectively equal to the Mlum and Nlum in numerical value;

the previous m frame(s) first luminance equalizing subunit 174 linearly modifies luminance values of pixel points with pixel values within an interval [Mpix, P2] by using the reference value Lo and the first luminance weighted adjustment coefficient C'L1, and obtains a luminance value L'1 of the current sub-picture video image within the interval [Mpix, P2]; and the previous m frame(s) second luminance equalizing subunit 175 linearly modifies luminance values of pixel points with pixel values within an interval [P2, Npix] by using the reference value Lo and the second luminance weighted adjustment coefficient C'L2, and obtains a luminance value L'2 of the current sub-picture video image within the interval [P2, Npix].

Figure 18:
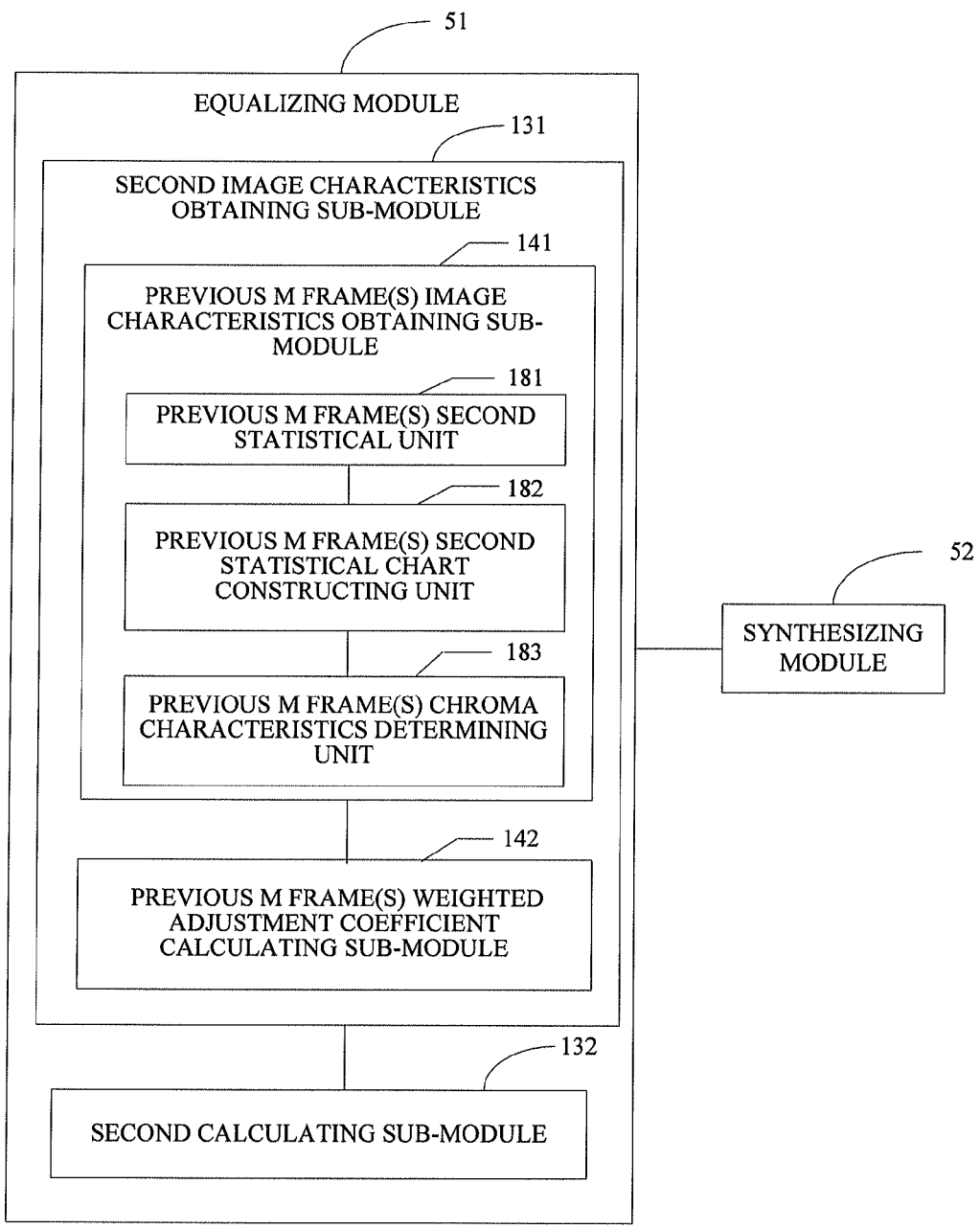
FIG. 18 is a view exemplarily illustrating the structure of the device provided by Embodiment 18 of the present invention for processing a multi-picture video image.

The previous m frame(s) image characteristics obtaining sub-module 141 may include a previous m frame(s) second statistical unit 181, a previous m frame(s) second statistical chart constructing unit 182 and a previous m frame(s) chroma characteristics determining unit 183, as shown in FIG. 18, which is a view exemplarily illustrating the structure of the device provided by Embodiment 18 of the present invention for processing a multi-picture video image, in which:

the previous m frame(s) second statistical unit 181 is used for making statistics about pixel points with chroma values close to chroma values of a white region of each frame of m frame(s) of sub-picture video images that are before the current sub-picture video image Fn;

the previous m frame(s) second statistical chart constructing unit 182 is used for constructing a pixel point-chroma value statistical chart of each frame of m frame(s) of sub-picture video images that are before the current sub-picture video image Fn from the pixel points with chroma values close to chroma values of the white region and the corresponding chroma values thereof; and the previous m frame(s) chroma characteristics determining unit 183 is used for determining chroma characteristics of each frame of m frame(s) of sub-picture video images that are before the current sub-picture video image Fn from the pixel point-chroma value statistical chart of each frame of m frame(s) of sub-picture video images that are before the current sub-picture video image Fn.

Figure 19:
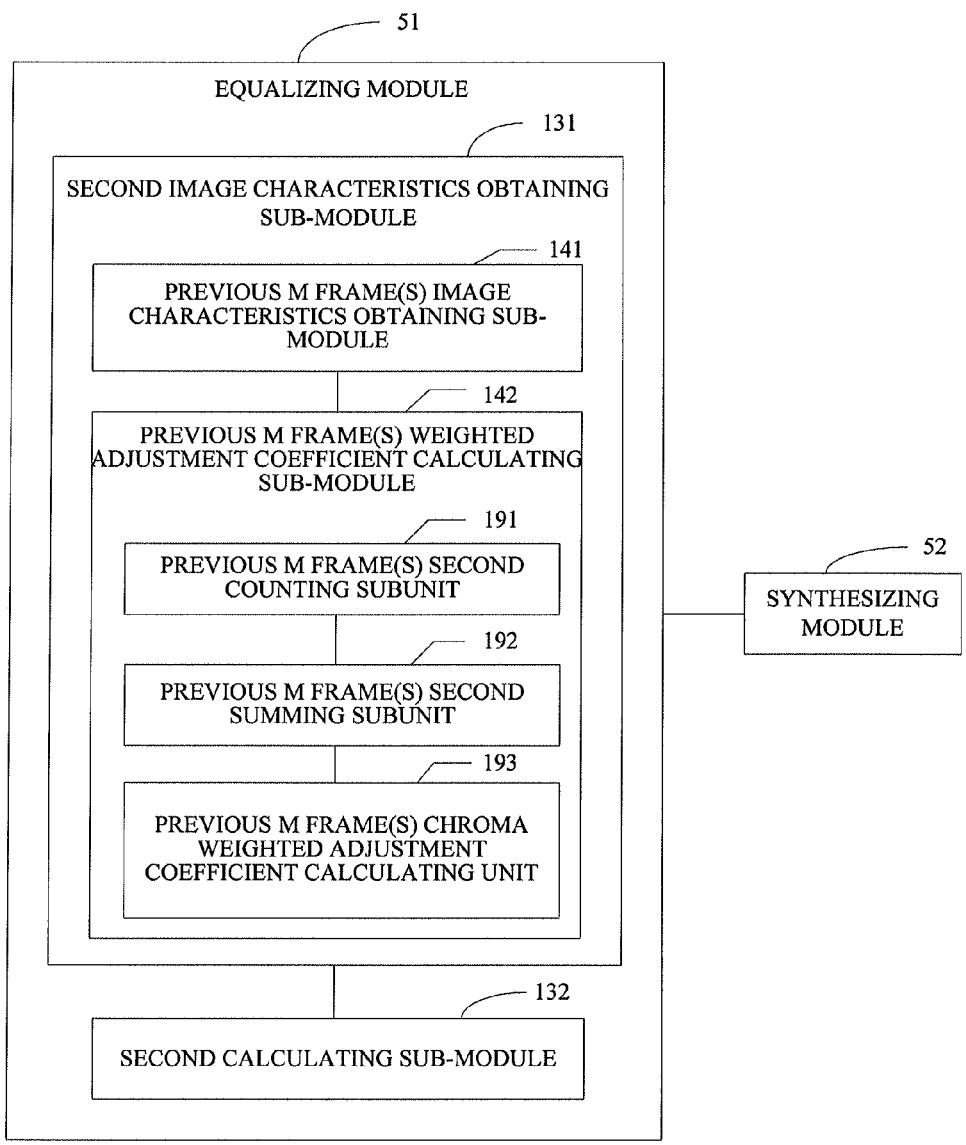
FIG. 19 is a view exemplarily illustrating the structure of the device provided by Embodiment 19 of the present invention for processing a multi-picture video image.

The previous m frame(s) weighted adjustment coefficient calculating sub-module 142 may further include a previous m frame(s) second counting subunit 191, a previous m frame(s) second summing subunit 192 and a previous m frame(s) chroma weighted adjustment coefficient calculating unit 193, as shown in FIG. 19, which is a view exemplarily illustrating the structure of the device provided by Embodiment 19 of the present invention for processing a multi-picture video image, in which:

the previous m frame(s) second counting subunit 191 is used for counting, from a pixel point with a pixel value of Upix, of pixel points with pixel values within an interval [Upix, Vpix] in the pixel point-chroma value statistical chart of each frame of the m frame(s) of sub-picture video image before the current sub-picture video image, obtaining a pixel value $P_{1k}'$ of a $W^{th}$ pixel point when counting to the $W^{th}$ pixel point for a $k^{th}$ sub-picture video image in previous m frame(s) of sub-picture video image(s), wherein k is 1, 2, ... m, and Upix is greater than or equal to 0, Vpix is smaller than or equal to Y, and Y is the maximum value used to describe pixel value standard;

the previous m frame(s) second summing subunit 192 is used for summing $P_{1k}'$ to obtain $$P'1 = \sum_{k=1}^{m} \frac{P'_{1k}}{m};$$

and the previous m frame(s) chroma weighted adjustment coefficient calculating unit 193 is used for calculating to obtain a first chroma weighted adjustment coefficient C'C1 and a second chroma weighted adjustment coefficient C'C2 from the Upix, Vpix, P'1 and C'o, wherein both the second chroma weighted adjustment coefficient C'C2 and the second chroma weighted adjustment coefficient C'C2 are of a linear relationship to the C'o.

Figure 20:
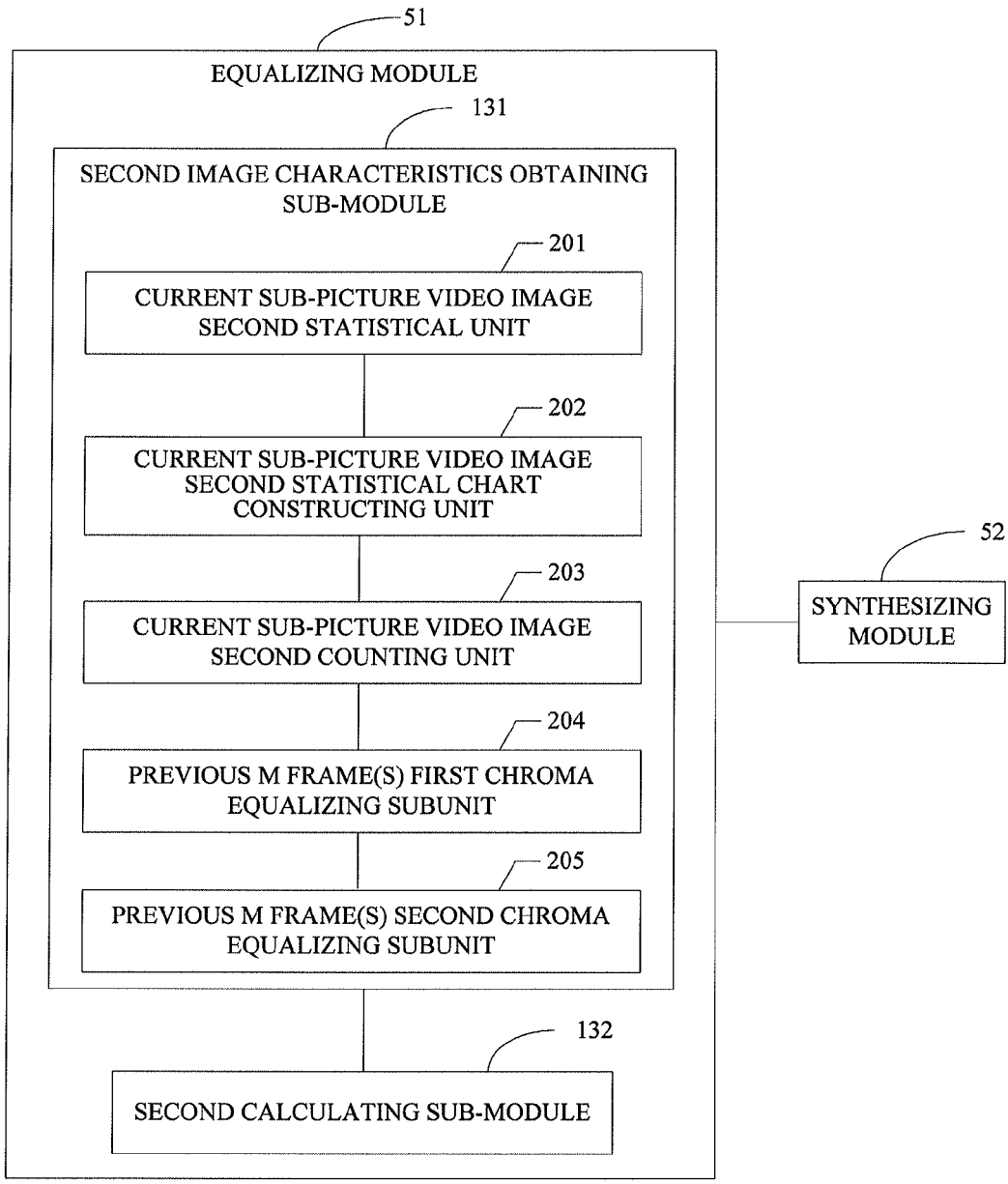
FIG. 20 is a view exemplarily illustrating the structure of the device provided by Embodiment 20 of the present invention for processing a multi-picture video image.

The second image characteristics obtaining sub-module 131 may include a current sub-picture video image second statistical unit 201, a current sub-picture video image second statistical chart constructing unit 202, a current sub-picture video image second counting unit 203, a previous m frame(s) first chroma equalizing subunit 204 and a previous m frame(s) second chroma equalizing subunit 205, as shown in FIG. 20, which is a view exemplarily illustrating the structure of the device for processing a multi-picture video image provided by Embodiment 20 of the present invention, in which:

the current sub-picture video image second statistical unit 201 is used for making statistics about pixel points with chroma values close to chroma values of a white region in the current sub-picture video image Fn;

the current sub-picture video image second statistical chart constructing unit 202 is used for constructing a pixel point-chroma value statistical chart of the current sub-picture video image Fn from the pixel points with chroma values close to chroma values of the white region and the corresponding chroma values thereof;

the current sub-picture video image second counting unit 203 is used for counting, from a pixel point with a pixel value of Xpix, of pixel points with pixel values within an interval [Xpix, Ypix] in the pixel point-chroma value statistical chart of the current sub-picture video image Fn, and obtaining a pixel value P3 of a $T^{th}$ pixel point while counting to the $T^{th}$ pixel point, wherein Xpix is greater than or equal to 0, Ypix is smaller than or equal to Y, and Y is the maximum value used to describe pixel value standard;

the previous m frame(s) first chroma equalizing subunit 204 linearly modifies chroma values of pixel points with pixel values within an interval [Xpix, P3] by using the reference value C'o and the first chroma weighted adjustment coefficient C'C1, and obtains a chroma value C'1 of the current sub-picture video image within the interval [Xpix, P3]; and the previous m frame(s) second chroma equalizing subunit 205 linearly modifies chroma values of pixel points with pixel values within an interval [P3, Ypix] by using the reference value C'o and the second chroma weighted adjustment coefficient C'C2, and obtains a chroma value C'2 of the current sub-picture video image within the interval [P3, Ypix].

As should be explained, since the information interaction among, execution processes of and technical effects of the various modules/units of the aforementioned devices are based on the same principles of the method embodiments of the present invention, see the relevant explanations in the method embodiments of the present invention for details, while no repetition is made here.

To more clearly explain the aforementioned embodiments of the present invention, application scenarios of the device for processing a multi-picture video image according to the embodiments of the present invention are given below.

Application Scenario A: a plurality of terminal conference halls, such as conference halls A, B, C and D as shown in the drawings, simultaneously participate during convention of a videoconference. Each terminal conference hall compresses video images of the instant conference hall by using a video compression protocol, and transfers the compressed video code stream to a multipoint controlling unit (MCU) via the network. After the multipoint controlling unit receives the video compressed code stream from each terminal conference hall, a decoding module makes use of the corresponding video compression protocol to decode each code stream to obtain sub-picture video images needed for reconstructing a multi-picture video image (as compared with a multi-picture video image formed by reorganizing). The sub-picture video images are inputted into the device for processing a multi-picture video image. After processing by the device for processing a multi-picture video image, the multipoint controlling unit recombines the sub-picture video images outputted from the device for processing a multi-picture video image to synthesize the sub-picture video images into a multi-picture video image. Each sub-picture video image of the multi-picture video image corresponds to one conference hall picture. An encoding module recodes the multi-picture video image and sends the encoded code stream to a receiving terminal, and the receiving terminal decodes the multi-picture video image and outputs the image to a display device, whereupon the multi-picture conference process is realized.

Application Scenario B: a plurality of terminal conference halls, such as conference halls A, B, C and D as shown in the drawings, simultaneously participate during convention of a videoconference. Each terminal conference hall compresses video images of the instant conference hall by using a video compression protocol, and transfers the compressed video code stream to a multipoint controlling unit via the network. After the multipoint controlling unit receives the video compressed code stream from each terminal conference hall, a decoding module makes use of the corresponding video compression protocol to decode each video compressed code stream to obtain sub-picture video images needed for reconstructing a multi-picture video image (as compared with a multi-picture video image formed by reorganizing). The sub-picture video images are inputted into the device for processing a multi-picture video image. After processing by the device for processing a multi-picture video image, an encoding module makes use of the video compression protocol again to encode each sub-picture video image and sends the encoded code stream to different receiving terminals, and the receiving terminals decode the stream code and output it to a display device, whereupon a multi-point conference process is realized.

Application Scenario C: a plurality of terminal conference halls, such as conference halls A, B, C and D as shown in the drawings, simultaneously participate during convention of a videoconference. Each terminal conference hall compresses video images of the instant conference hall by using a video compression protocol, and transfers the compressed video code stream to a multipoint controlling unit via the network. After the multipoint controlling unit receives the video compressed code stream from each terminal conference hall, a decoding module makes use of the corresponding video compression protocol to decode each video compressed code stream according to the format of the conference to obtain sub-picture video images needed for reconstructing a multi-picture video image (as compared with a multi-picture video image formed by reorganizing). Thereafter, an encoding module makes use of the video compression protocol again to encode each sub-picture video image and sends the encoded code stream to a receiving terminal that contains the device for processing a multi-picture video image. After processing by the device for processing a multi-picture video image and decoding by the receiving terminal, the sub-picture video images are outputted to different display devices, whereupon a multi-point conference process is realized. The encoding module may as well be dispensed with in this application scenario, in which case a code stream from several channels is directly transferred to the receiving terminal after decoding by the decoding module, and is then decoded and processed by the device for processing a multi-picture video image contained in the receiving terminal to be subsequently outputted to different display devices, whereupon a multi-point conference process is realized.

As comprehensible to persons ordinarily skilled in the art, the entire or partial steps in the various methods of the foregoing embodiments can be realized by a program that instructs relevant hardware, and the program can be stored in a computer-readable storage medium, which may include a read-only memory (ROM), a random access memory (RAM), a magnetic disk or an optical disk.

The methods and devices for processing a multi-picture video image provided by the embodiments of the present invention are described in detail above, and concrete examples are used in this paper to enunciate the principles and embodiments of the present invention. The above explanations of the embodiments are merely meant to help understand the methods of the present invention and essential principles thereof. To persons ordinarily skilled in the art, there may be variations both in terms of specific embodiments and scopes of application without departing from the principles of the present invention. In summary, contents of the Description shall not be understood as restrictive of the present invention.

The invention claimed is:

1. A method for processing a multi-picture video image, comprising:
receiving a data code stream of sub-picture video images from several channels;
equalizing displaying effect of the sub-picture video images from several channels with control parameters respectively according to image characteristics of the sub-picture video images; and
synthesizing the equalized sub-picture video images from several channels to a multi-picture video image,
wherein equalizing displaying effect of the sub-picture video images from several channels with control parameters respectively according to image characteristics of the sub-picture video images comprises:
obtaining image characteristics of a current sub-picture video image;
calculating an adjustment coefficient according to a control parameter and the image characteristics of the current sub-picture video image; and
equalizing displaying effect of the current sub-picture video image by using the control parameter and the adjustment coefficient.

2. The method according to claim 1, wherein obtaining image characteristics of a current sub-picture video image comprises:

making statistics about pixel points with in the current sub-picture video image luminance values within an interval [Alum, Blum], where Alum is greater than or equal to 0, Blum is smaller than or equal to Lm, and Lm is the maximum value used to describe luminance standard;

constructing a pixel point-luminance value statistical chart from the pixel points within the interval [Alum, Blum] and the luminance values to which the pixel points correspond; and determining luminance characteristics of the current sub-picture video image from the pixel point-luminance value statistical chart, wherein the luminance characteristics of the current sub-picture video image are the image characteristics of the current sub-picture video image, wherein the control parameter is a reference value Lo used to equalize the current sub-picture video image to a target luminance value, and calculating an adjustment coefficient according to a control parameter and the image characteristics of the current sub-picture video image comprises:

Counting, from a pixel point with a pixel value of Apix, of pixel points with pixel values within an interval [Apix, Bpix] in the pixel point-luminance value statistical chart, and obtaining a pixel value PQ of a $k^{th}$ pixel point when counting to the $k^{th}$ pixel point, wherein the Apix and Bpix are respectively equal to the Alum and Blum in numerical value; and calculating to obtain a first luminance adjustment coefficient CL1 of the current sub-picture video image and a second luminance adjustment coefficient CL2 of the current sub-picture video image from the Apix, Bpix, P0 and Lo, wherein both the first luminance adjustment coefficient CL1 and the second luminance adjustment coefficient CL2 are of a linear relationship to the Lo, and wherein equalizing displaying effect of the current sub-picture video image by using the control parameter and the adjustment coefficient comprises:

linearly modifying luminance values of pixel points with pixel values within an interval [Apix, P0] by using the reference value Lo and the first luminance adjustment coefficient CL1, and obtaining a luminance value L1 of the current sub-picture video image within the interval [Apix, P0]; and linearly modifying luminance values of pixel points with pixel values within an interval [P0, Bpix] by using the reference value Lo and the second luminance adjustment coefficient CL2, and obtaining a luminance value L2 of the current sub-picture video image within the interval [P0, Bpix].

3. The method according to claim 1, wherein obtaining image characteristics of a current sub-picture video image comprises:

making statistics about pixel points with chroma values close to chroma values of a white region in the current sub-picture video image;

constructing a pixel point-chroma value statistical chart from the pixel points with chroma values close to chroma values of the white region and the corresponding chroma values thereof; and determining chroma characteristics of the current sub-picture video image from the pixel point-chroma value statistical chart, wherein the chroma characteristics of the current sub-picture video image are the image characteristics of the current sub-picture video image.

4. The method according to claim 3, wherein the control parameter is a reference value Co used to equalize the current sub-picture video image to a target chroma value, and calculating an adjustment coefficient according to a control parameter and the image characteristics of the current sub-picture video image comprises:

Counting, from a pixel point with a pixel value of Jpix, of pixel points with pixel values within an interval [Jpix, Kpix] in the pixel point-chroma value statistical chart, and obtaining a pixel value P1 of a $J^{th}$ pixel point when counting to the $J^{th}$ pixel point, wherein Jpix is greater than or equal to 0, Kpix is smaller than or equal to Y, and Y is the maximum value used to describe pixel value standard; and calculating to obtain a first chroma adjustment coefficient CC1 of the current sub-picture video image and a second chroma adjustment coefficient CC2 of the current sub-picture video image from the Jpix, Kpix, P1 and Co, wherein both the first chroma adjustment coefficient CC1 and the second chroma adjustment coefficient CC2 are of a linear relationship to the Co, wherein equalizing displaying effect of the current sub-picture video image by using the control parameter and the adjustment coefficient comprises:

linearly modifying chroma values of pixel points with pixel values within an interval [Jpix, P1] by using the reference value Co and the first chroma adjustment coefficient CC1, and obtaining a chroma value C1 of the current sub-picture video image within the interval [Jpix, P1]; and linearly modifying chroma values of pixel points with pixel values within an interval [P1, Kpix] by using the reference value Co and the second chroma adjustment coefficient CC2, and obtaining a chroma value C2 of the current sub-picture video image within the interval [P1, Kpix].

5. A method for processing a multi-picture video image, comprising:

receiving a data code stream of sub-picture video images from several channels;

equalizing displaying effect of the sub-picture video images from several channels with control parameters respectively according to image characteristics of the sub-picture video images; and synthesizing the equalized sub-picture video images from several channels to a multi-picture video image, wherein equalizing displaying effect of the sub-picture video images from several channels with control parameters respectively according to image characteristics of the sub-picture video images comprises:

receiving a current sub-picture video image Fn;

equalizing displaying effect of the received current sub-picture video image Fn and obtaining image characteristics of the current sub-picture video image Fn by using a control parameter and a weighted adjustment coefficient of m frame of sub-picture video images that are before the current sub-picture video image Fn; and calculating an adjustment coefficient of the current sub-picture video image Fn before equalization according to the image characteristics of the current sub-picture video image Fn before equalization, where m is a natural number greater than or equal to 1.

6. The method according to claim 5, wherein obtaining the weighted adjustment coefficient of m frame(s) of the sub-picture video images that are before the current sub-picture video image Fn comprises:

obtaining image characteristics of each frame of the m frame(s) of sub-picture video image in the sub-picture video images that are before the Fn; and calculating the weighted adjustment coefficient of the m frame(s) of sub-picture video images that are before the Fn according to the control parameter and the image characteristics of each frame of the m frame(s) of sub-picture video image in the sub-picture video images that are before the Fn.

7. The method according to claim 6, wherein obtaining image characteristics of each frame of m frame(s) of sub-picture video images that are before the current sub-picture video image Fn comprises:

making statistics about pixel points in each frame of the m frame of sub-picture video image in the sub-picture video images that are before the Fn with luminance values within an interval [Slum, Tlum], where Slum is greater than or equal to 0, Tlum is smaller than or equal to Lm, and Lm is the maximum value used to describe luminance standard;

constructing a pixel point-luminance value statistical chart of each frame of the m frame(s) of sub-picture video image that are before the Fn from the pixel points with luminance values within the interval [Slum, Tlum] and the luminance values to which the pixel points correspond; and determining luminance characteristics of each frame of the m frame(s) sub-picture video image that are before the Fn from the pixel point-luminance value statistical chart, wherein the luminance characteristics of each frame of sub-picture video image are the image characteristics of each frame of sub-picture video image, wherein the control parameter is a reference value L'o used to equalize each frame of sub-picture video image in the m frame(s) to a target luminance value, and calculating the weighted adjustment coefficient of the m frame(s) of sub-picture video images that are before the Fn according to the control parameter and the image characteristics of each frame of the m frame(s) of sub-picture video image in the sub-picture video images that are before the Fn comprises:

Counting, from a pixel point with a pixel value of Spix, of pixel points with pixel values within an interval [Spix, Tpix] in the pixel point-luminance value statistical chart of each frame of the m frame(s) of sub-picture video image, wherein the Spix and Tpix are respectively equal to the Slum and Tlum in numerical value;

obtaining a pixel value $P_{0j}'$ of a $Q^{th}$ pixel point when counting to the $Q^{th}$ pixel point for a $j^{th}$ sub-picture video image in m frame(s) of sub-picture video image(s), wherein j is 1, 2, ... m;

summing $P_{0j}'$ to obtain $$P'0 = \sum_{j=1}^{m} \frac{P'_{0j}}{m};$$

and calculating to obtain a first luminance weighted adjustment coefficient C'L1 of the m frame(s) of sub-picture video images that are before the Fn and a second luminance weighted adjustment coefficient C'L2 of the m frame(s) of sub-picture video images that are before the Fn from the Spix, Tpix, P'0 and L'o, wherein both the first luminance weighted adjustment coefficient C'L2 and the second luminance weighted adjustment coefficient C'L2 are of a linear relationship to the L'o, and wherein equalizing displaying effect of the received current sub-picture video image Fn by using a control parameter and a weighted adjustment coefficient of the m frame(s) sub-picture video images that are before the current sub-picture video image Fn comprises:

making statistics about pixel points with luminance values in the current sub-picture video image Fn within an interval [Mlum, Nlum], where Mlum is greater than or equal to 0, Nlum is smaller than or equal to Lm, and Lm is the maximum value used to describe luminance standard;

constructing a pixel point-luminance value statistical chart of the current sub-picture video image Fn from the pixel points within the interval [Mlum, Nlum] and the luminance values to which the pixel points correspond;

counting, from a pixel point with a pixel value of Mpix, of pixel points with pixel values within an interval [Mpix, Npix] in the pixel point-luminance value statistical chart of the current sub-picture video image Fn, and obtaining a pixel value P2 of a $P^{th}$ pixel point while counting to the $P^{th}$ pixel point, wherein the Mpix and Npix are respectively equal to the Mlum and Nlum in numerical value;

linearly modifying luminance values of pixel points with pixel values within an interval [Mpix, P2] by using the reference value Lo and the first luminance weighted adjustment coefficient C'L1, and obtaining a luminance value L'1 of the current sub-picture video image within the interval [Mpix, P2]; and linearly modifying luminance values of pixel points with pixel values within an interval [P2, Npix] by using the reference value Lo and the second luminance weighted adjustment coefficient C'L2, and obtaining a luminance value L'2 of the current sub-picture video image within the interval [P2, Npix].

8. The method according to claim 6, wherein obtaining image characteristics of each frame of m frame(s) of sub-picture video images that are before the current sub-picture video image Fn comprises:

making statistics about pixel points with chroma values close to chroma values of a white region of each frame of the m frame(s) of sub-picture video image that are before the Fn;

constructing a pixel point-chroma value statistical chart of each frame of the m frame(s) of sub-picture video image in the sub-picture video images that are m frame(s) before the Fn from the pixel points with chroma values close to chroma values of the white region and the corresponding chroma values thereof; and determining chroma characteristics of each frame of sub-picture video image in the sub-picture video images that are m frame(s) before the Fn from the pixel point-chroma value statistical chart of each frame of the m frame(s) of sub-picture video image in the sub-picture video images that are before the Fn, wherein the chroma characteristics of each frame of sub-picture video image are the image characteristics of each frame of sub-picture video image, wherein the control parameter is a reference value C'o used to equalize the current sub-picture video image to a target chroma value, and calculating the weighted adjustment coefficient of the m frame(s) of sub-picture video images that are before the Fn according to the control parameter and the image characteristics of each frame of the m frame(s) of sub-picture video image in the sub-picture video images that are before the Fn comprises:

Counting, from a pixel point with a pixel value of Upix, of pixel points with pixel values within an interval [Upix, Vpix] in the pixel point-chroma value statistical chart of each frame of m frame(s) of sub-picture video image, where Upix is greater than or equal to 0, Vpix is smaller than or equal to Y, and Y is the maximum value used to describe pixel value standard;

obtaining a pixel value $P_{1k}'$ of a $W^{th}$ pixel point when counting to the $W^{th}$ pixel point for a $k^{th}$ sub-picture video image in m frame(s) of sub-picture video image(s), wherein k is 1, 2, ... m;

summing $P_{1k}'$ to obtain $$P'1 = \sum_{k=1}^{m} \frac{P'_{1k}}{m};$$

and calculating to obtain a first chroma weighted adjustment coefficient C'C1 of the m frame(s) of sub-picture video images that are before the Fn and a second chroma weighted adjustment coefficient C'C2 of the m frame(s) of sub-picture video images that are before the Fn from the Upix, Vpix, P'1 and C'o, wherein both the second chroma weighted adjustment coefficient C'C2 and the second chroma weighted adjustment coefficient C'C2 are of a linear relationship to the C'o, and wherein equalizing displaying effect of the received current sub-picture video image Fn by using a control parameter and a weighted adjustment coefficient of the m frame(s) of sub-picture video images that are before the current sub-picture video image Fn comprises:

making statistics about pixel points with chroma values close to chroma values of a white region in the current sub-picture video image Fn;

constructing a pixel point-chroma value statistical chart of the current sub-picture video image Fn from the pixel points with chroma values close to chroma values of the white region and the corresponding chroma values thereof;

counting, from a pixel point with a pixel value of Xpix, of pixel points with pixel values within an interval [Xpix, Ypix] in the pixel point-chroma value statistical chart of the current sub-picture video image Fn, and obtaining a pixel value P3 of a $T^{th}$ pixel point while counting to the $T^{th}$ pixel point, wherein Xpix is greater than or equal to 0, Ypix is smaller than or equal to Y, and Y is the maximum value used to describe pixel value standard;

linearly modifying chroma values of pixel points with pixel values within an interval [Xpix, P3] by using the reference value C'o and the first chroma weighted adjustment coefficient C'C1, and obtaining a chroma value C'1 of the current sub-picture video image within the interval [Xpix, P3]; and linearly modifying chroma values of pixel points with pixel values within an interval [P3, Ypix] by using the reference value C'o and the second chroma weighted adjustment coefficient C'C2, and obtaining a chroma value C'2 of the current sub-picture video image within the interval [P3, Ypix].

9. A device for processing a multi-picture video image, comprising:

an equalizing module, for receiving a data code stream of sub-picture video images from several channels, and equalizing displaying effect of the sub-picture video images from the several channels with control parameters respectively according to image characteristics of the sub-picture video images; and a synthesizing module, for synthesizing the sub-picture video images equalized by the equalizing module to a multi-picture video image, wherein the equalizing module comprises:

a first image characteristics obtaining sub-module, for obtaining image characteristics of a current sub-picture video image;

a first calculating sub-module, for calculating an adjustment coefficient according to a control parameter and the image characteristics of the current sub-picture video image obtained by the first image characteristics obtaining sub-module; and a first equalizing sub-module, for equalizing displaying effect of the current sub-picture video image by using the control parameter and the adjustment coefficient calculated by the first calculating sub-module.

10. The device according to claim 9, wherein the first image characteristics obtaining sub-module comprises:

a first statistical unit, for making statistics about pixel points in the current sub-picture video image with luminance values within an interval [Alum, Blum], where Alum is greater than or equal to 0, Blum is smaller than or equal to Lm, and Lm is the maximum value used to describe luminance standard;

a first statistical chart constructing unit, for constructing a pixel point-luminance value statistical chart from the pixel points within the interval [Alum, Blum] and the luminance values to which the pixel points correspond; and a luminance characteristics determining unit, for determining luminance characteristics of the current sub-picture video image from the pixel point-luminance value statistical chart, wherein the luminance characteristics of the current sub-picture video image are the image characteristics of the current sub-picture video image;

wherein the first calculating sub-module comprises:

a first counting unit, for counting, from a pixel point with a pixel value of Apix, of pixel points with pixel values within an interval [Apix, Bpix] in the pixel point-luminance value statistical chart, and obtaining a pixel value P0 of a kth pixel point when counting to the kth pixel point, wherein the Apix and Bpix are respectively equal to the Alum and Blum in numerical value; and a luminance adjustment coefficient calculating unit, for calculating to obtain a first luminance adjustment coefficient CL1 and a second luminance adjustment coefficient CL2 from the Apix, Bpix, P0 and Lo, wherein both the first luminance adjustment coefficient CL1 and the second luminance adjustment coefficient CL2 are of a linear relationship to the Lo, wherein the first equalizing sub-module comprises:

a first luminance equalizing subunit, for linearly modifying luminance values of pixel points with pixel values within an interval [Apix, P0] by using the reference value Lo and the first luminance adjustment coefficient CL1, and obtaining a luminance value L1 of the current sub-picture video image within the interval [Apix, P0]; and a second luminance equalizing subunit, for linearly modifying luminance values of pixel points with pixel values within an interval [P0, Bpix] by using the reference value Lo and the second luminance adjustment coefficient CL2, and obtaining a luminance value L2 of the current sub-picture video image within the interval [P0, Bpix].

11. The device according to claim 9, wherein the first image characteristics obtaining sub-module comprises:
   a second statistical unit, for making statistics about pixel points with chroma values close to chroma values of a white region in the current sub-picture video image;
   a second statistical chart constructing unit, for constructing a pixel point-chroma value statistical chart from the pixel points with chroma values close to chroma values of the white region and the corresponding chroma values thereof; and
   a chroma characteristics determining unit, for determining chroma characteristics of the current sub-picture video image from the pixel point-chroma value statistical chart, wherein the chroma characteristics of the current sub-picture video image are the image characteristics of the current sub-picture video image.

12. The device according to claim 9, wherein the first calculating sub-module comprises:
   a second counting unit, for counting, from a pixel point with a pixel value of Jpix, of pixel points with pixel values within an interval [Jpix, Kpix] in the pixel point-chroma value statistical chart, and obtaining a pixel value P1 of a $J^{th}$ pixel point when counting to the $J^{th}$ pixel point, wherein Jpix is greater than or equal to 0, Kpix is smaller than or equal to Y, and Y is the maximum value used to describe pixel value standard; and
   a chroma adjustment coefficient calculating unit, for calculating to obtain a first chroma adjustment coefficient CC1 and a second chroma adjustment coefficient CC2 from the Jpix, Kpix, P1 and Co, wherein both the first chroma adjustment coefficient CC1 and the second chroma adjustment coefficient CC2 are of a linear relationship to the Co.

13. The device according to claim 12, wherein the first equalizing sub-module comprises:
   a first chroma equalizing subunit, for linearly modifying chroma values of pixel points with pixel values within an interval [Jpix, P1] by using the reference value Co and the first chroma adjustment coefficient CC1, and obtaining a chroma value C1 of the current sub-picture video image within the interval [Jpix, P1]; and
   a second chroma equalizing subunit, for linearly modifying chroma values of pixel points with pixel values within an interval [P1, Kpix] by using the reference value Co and the second chroma adjustment coefficient CC2, and obtaining a chroma value C2 of the current sub-picture video image within the interval [P1, Kpix].

14. A device for processing a multi-picture video image, comprising:
   an equalizing module, for receiving a data code stream of sub-picture video images from several channels, and equalizing displaying effect of the sub-picture video images from the several channels with control parameters respectively according to image characteristics of the sub-picture video images; and
   a synthesizing module, for synthesizing the sub-picture video images equalized by the equalizing module to a multi-picture video image,
   wherein the equalizing module comprises:
   a second image characteristics obtaining sub-module, for equalizing displaying effect of a received current sub-picture video image Fn and obtaining image characteristics of the current sub-picture video image Fn by using a control parameter and a weighted adjustment coefficient of m frame(s) of sub-picture video images that are before the current sub-picture video image Fn while receiving the current sub-picture video image Fn; and
   a second calculating sub-module, for calculating an adjustment coefficient of the current sub-picture video image Fn before equalization according to the image characteristics of the current sub-picture video image before equalization Fn obtained by the second image characteristics obtaining sub-module, where m is a natural number greater than or equal to 1.

15. The device according to claim 14, wherein the second image characteristics obtaining sub-module comprises:
   a previous m frame(s) image characteristics obtaining sub-module, for obtaining image characteristics of each frame of m frame(s) of sub-picture video images that are before the current sub-picture video image Fn; and
   a previous m frame(s) weighted adjustment coefficient calculating sub-module, for calculating the weighted adjustment coefficient of the sub-picture video images that are m frame(s) before the current sub-picture video image Fn according to the control parameter and the image characteristics of each frame of m frame(s) of sub-picture video images that are before the current sub-picture video image Fn.

16. The device according to claim 15, wherein the previous m frame(s) image characteristics obtaining sub-module comprises:
   a previous m frame(s) first statistical unit, for making statistics about pixel points in each frame of m frame(s) of sub-picture video images that are before the current sub-picture video image Fn with luminance values within an interval [Slum, Tlum], where Slum is greater than or equal to 0, Tlum is smaller than or equal to Lm, and Lm is the maximum value used to describe luminance standard;
   a previous m frame(s) first statistical chart constructing unit, for constructing a pixel point-luminance value statistical chart of each frame of m frame(s) of sub-picture video images that are before the current sub-picture video image Fn from the pixel points with luminance values within the interval [Slum, Tlum] and the luminance values to which the pixel points correspond; and
   a previous m frame(s) luminance characteristics determining unit, for determining luminance characteristics of each frame of m frame(s) of sub-picture video images that are before the current sub-picture video image Fn from the pixel point-luminance value statistical chart, wherein the luminance characteristics of each frame of sub-picture video image are the image characteristics of each frame of sub-picture video image,
   wherein the previous m frame(s) weighted adjustment coefficient calculating sub-module comprises:
   a previous m frame(s) first counting subunit, for counting, from a pixel point with a pixel value of Spix, of pixel points with pixel values within an interval [Spix, Tpix] in the pixel point-luminance value statistical chart of each frame of the m frame(s) of sub-picture video image before the current sub-picture video frame, and obtaining a pixel value $P_{oj}'$ of a $Q^{th}$ pixel point when counting to the $Q^{th}$ pixel point for a $j^{th}$ sub-picture video image in the m frame(s) of sub-picture video image(s) before the current sub-picture video image, wherein j is 1, 2, . . . m, and the Spix and Tpix are respectively equal to the Slum and Tlum in numerical value;

a previous m frame(s) first summing subunit, for summing $P_{0j}'$ to obtain $$P'0 = \sum_{j=1}^{m} \frac{P'_{0j}}{m};$$

and
a previous m frame(s) luminance weighted adjustment coefficient calculating unit, for calculating to obtain a first luminance weighted adjustment coefficient C'L1 and a second luminance weighted adjustment coefficient C'L2 from the Spix, Tpix, P'0 and L'o, wherein both the first luminance weighted adjustment coefficient C'L2 and the second luminance weighted adjustment coefficient C'L2 are of a linear relationship to the L'o,
wherein the second image characteristics obtaining sub-module comprises:
a current sub-picture video image first statistical unit, for making statistics about pixel points in the current sub-picture video image Fn with luminance values within an interval [Mlum, Nlum], where Mlum is greater than or equal to 0, Nlum is smaller than or equal to Lm, and Lm is the maximum value used to describe luminance standard;
a current sub-picture video image first statistical chart constructing unit, for constructing a pixel point-luminance value statistical chart of the current sub-picture video image Fn from the pixel points within the interval [Mlum, Nlum] and the luminance values to which the pixel points correspond;
a current sub-picture video image first counting unit, for counting, from a pixel point with a pixel value of Mpix, of pixel points with pixel values within an interval [Mpix, Npix] in the pixel point-luminance value statistical chart of the current sub-picture video image Fn, and obtaining a pixel value P2 of a $P^{th}$ pixel point while counting to the $P^{th}$ pixel point, wherein the Mpix and Npix are respectively equal to the Mium and Nlum in numerical value;
a previous m frame(s) first luminance equalizing subunit, for linearly modifying luminance values of pixel points with pixel values within an interval [Mpix, P2] by using the reference value Lo and the first luminance weighted adjustment coefficient C'L1, and obtaining a luminance value L'1 of the current sub-picture video image within the interval [Mpix, P2]; and
a previous m frame(s) second luminance equalizing subunit, for linearly modifying luminance values of pixel points with pixel values within an interval [P2, Npix] by using the reference value Lo and the second luminance weighted adjustment coefficient C'L2, and obtaining a luminance value L'2 of the current sub-picture video image within the interval [P2, Npix].

17. The device according to claim 15, wherein the previous m frame(s) image characteristics obtaining sub-module comprises:
a previous m frame(s) second statistical unit, for making statistics about pixel points with chroma values close to chroma values of a white region of each frame of m frame(s) of sub-picture video images that are before the current sub-picture video image Fn;
a previous m frame(s) second statistical chart constructing unit, for constructing a pixel point-chroma value statistical chart of each frame of m frame(s) of sub-picture video images that are before the current sub-picture video image Fn from the pixel points with chroma values close to chroma values of the white region and the corresponding chroma values thereof; and
a previous m frame(s) chroma characteristics determining unit, for determining chroma characteristics of each frame of m frame(s) of sub-picture video images that are before the current sub-picture video image Fn from the pixel point-chroma value statistical chart of each frame of m frame(s) of sub-picture video images that are before the current sub-picture video image Fn, wherein the chroma characteristics of each frame of sub-picture video image are the image characteristics of each frame of sub-picture video image,
wherein the previous m frame(s) weighted adjustment coefficient calculating sub-module comprises:
a previous m frame(s) second counting subunit, for counting, from a pixel point with a pixel value of Upix, of pixel points with pixel values within an interval [Upix, Vpix] in the pixel point-chroma value statistical chart of each frame of the m frame(s) of sub-picture video image before the current sub-picture video image, obtaining a pixel value $P_{1k}'$ of a $W^{th}$ pixel point when counting to the $W^{th}$ pixel point for a $k^{th}$ sub-picture video image in previous m frame(s) of sub-picture video image(s), wherein k is 1, 2, ... m, and Upix is greater than or equal to 0, Vpix is smaller than or equal to Y, and Y is the maximum value used to describe pixel value standard;
a previous m frame(s) second summing subunit, for summing $P_{1k}'$ to obtain $$P'1 = \sum_{k=1}^{m} \frac{P'_{1k}}{m};$$

and
a previous m frame(s) chroma weighted adjustment coefficient calculating unit, for calculating to obtain a first chroma weighted adjustment coefficient C'C1 and a second chroma weighted adjustment coefficient C'C2 from the Upix, Vpix, P'1 and C'o, wherein both the second chroma weighted adjustment coefficient C'C2 and the second chroma weighted adjustment coefficient C'C2 are of a linear relationship to the C'o, and wherein the second image characteristics obtaining sub-module comprises:
a current sub-picture video image second statistical unit, for making statistics about pixel points with chroma values close to chroma values of a white region in the current sub-picture video image Fn;
a current sub-picture video image second statistical chart constructing unit, for constructing a pixel point-chroma value statistical chart of the current sub-picture video image Fn from the pixel points with chroma values close to chroma values of the white region and the corresponding chroma values thereof;
a current sub-picture video image second counting unit, for counting, from a pixel point with a pixel value of Xpix, of pixel points with pixel values within an interval [Xpix, Ypix] in the pixel point-chroma value statistical chart of the current sub-picture video image Fn, and obtaining a pixel value P3 of a $T^{th}$ pixel point while counting to the $T^{th}$ pixel point, wherein Xpix is greater than or equal to 0, Ypix is smaller than or equal to Y, and Y is the maximum value used to describe pixel value standard;

a previous m frame(s) first chroma equalizing subunit, for linearly modifying chroma values of pixel points with pixel values within an interval [Xpix, P3] by using the reference value C'o and the first chroma weighted adjustment coefficient C'C1, and obtaining a chroma value C'1 of the current sub-picture video image within the interval [Xpix, P3]; and a previous m frame(s) second chroma equalizing subunit, for linearly modifying chroma values of pixel points with pixel values within an interval [P3, Ypix] by using the reference value C'o and the second chroma weighted adjustment coefficient C'C2, and obtaining a chroma value C'2 of the current sub-picture video image within the interval [P3, Ypix].

* * * * *